(12) United States Patent
Kamei et al.

(10) Patent No.: US 10,295,744 B2
(45) Date of Patent: May 21, 2019

(54) COHERENT OPTICAL MIXER CIRCUIT

(71) Applicant: NIPPON TELEGRAPH AND TELEPHONE CORPORATION, Tokyo (JP)

(72) Inventors: Shin Kamei, Atsugi (JP); Makoto Jizodo, Atsugi (JP); Hiroshi Fukuda, Atsugi (JP); Kiyofumi Kikuchi, Atsugi (JP); Ken Tsuzuki, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 15/568,610

(22) PCT Filed: May 27, 2016

(86) PCT No.: PCT/JP2016/002563
§ 371 (c)(1),
(2) Date: Oct. 23, 2017

(87) PCT Pub. No.: WO2016/194349
PCT Pub. Date: Dec. 8, 2016

(65) Prior Publication Data
US 2018/0143376 A1    May 24, 2018

(30) Foreign Application Priority Data
May 29, 2015 (JP) .................. 2015-110769

(51) Int. Cl.
*G02B 6/125* (2006.01)
*G02B 6/126* (2006.01)
(Continued)

(52) U.S. Cl.
CPC .............. *G02B 6/125* (2013.01); *G02B 6/00* (2013.01); *G02B 6/126* (2013.01); *G02B 6/2813* (2013.01);
(Continued)

(58) Field of Classification Search
None
See application file for complete search history.

(56) References Cited

U.S. PATENT DOCUMENTS

| 7,184,625 B2 * | 2/2007 | Gunn, III | ........... G02B 6/12004 372/6 |
| 2011/0064422 A1 * | 3/2011 | Kim | .................... G02B 6/12004 398/214 |

(Continued)

FOREIGN PATENT DOCUMENTS

| EP | 2624513 A2 | 8/2013 |
| JP | H09-191152 A | 7/1997 |

(Continued)

OTHER PUBLICATIONS

H. G. Bach et al., *Monolithic 90° C. Hybrid with Balanced PIN Photodiodes for 100 Gbit/s PM-QPSK Receiver Applications*, OSA/OFC/NFOEC 2009, pp. 3.

(Continued)

Primary Examiner — Michelle R Connelly
(74) Attorney, Agent, or Firm — Workman Nydegger

(57) ABSTRACT

A coherent optical mixer circuit is provided that can measure a phase error without requiring a step of cutting away a delay circuit. Odd-numbered or even-numbered two of four inputs of an 4-input-and-4-output multimode interference circuit are connected to an input mechanism. The four outputs of the multimode interference circuit are all connected to an output mechanism to the exterior. Other two inputs of the multimode interference circuit are connected to two monitor waveguides. One of the monitor waveguide is longer than the other to configure a light delay circuit. The monitor waveguides constituting the light delay circuit are connected to the respective outputs of a 2-branched light splitter. The 2-branched light splitter has an input connected to a monitor (Continued)

light input mechanism from the exterior via a monitor input waveguide.

7 Claims, 34 Drawing Sheets

(51) Int. Cl.
 G02B 6/28 (2006.01)
 G02F 2/00 (2006.01)
 H04J 14/06 (2006.01)
 G02B 6/00 (2006.01)
(52) U.S. Cl.
 CPC ............... *G02F 2/00* (2013.01); *G02F 2/002* (2013.01); *H04J 14/06* (2013.01)

(56) References Cited

U.S. PATENT DOCUMENTS

| | | | |
|---|---|---|---|
| 2011/0150386 A1* | 6/2011 | Dupuis | B29D 11/00663 385/14 |
| 2011/0229074 A1 | 9/2011 | Jeong | |
| 2012/0093457 A1* | 4/2012 | Sakamaki | H04B 10/60 385/14 |
| 2012/0106984 A1 | 5/2012 | Jones et al. | |
| 2012/0141067 A1 | 6/2012 | Sakamaki et al. | |
| 2012/0207474 A1 | 8/2012 | Inoue et al. | |
| 2012/0224813 A1 | 9/2012 | Chen et al. | |
| 2012/0230631 A1 | 9/2012 | Jeong | |
| 2013/0330038 A1 | 12/2013 | Onishi | |
| 2014/0363127 A1* | 12/2014 | Baets | G02B 6/124 385/37 |
| 2015/0247779 A1 | 9/2015 | Okamoto | |
| 2016/0285561 A1* | 9/2016 | Wu | G02B 6/305 |
| 2016/0363728 A1* | 12/2016 | Wang | G02B 6/34 |

FOREIGN PATENT DOCUMENTS

| | | |
|---|---|---|
| JP | 4410149 B2 | 2/2010 |
| JP | 2011-197245 A | 10/2011 |
| JP | 2012-518202 A | 8/2012 |
| JP | 2012-212098 A | 11/2012 |
| JP | 2013/254163 A | 12/2013 |
| JP | 2014-059542 A | 4/2014 |
| WO | 2011/004614 A1 | 1/2011 |
| WO | 2014/025824 A2 | 2/2014 |
| WO | 2014/034238 A1 | 3/2014 |

OTHER PUBLICATIONS

International Search Report dated Aug. 23, 2016, issued in PCT Application No. PCT/JP2016/002563, filed May 26, 2016.
International Preliminary Report on Patentability dated Dec. 14, 2017, issued in PCT Application No. PCT/JP2016/002563, filed May 26, 2016.
Search Report and Written Opinion dated May 22, 2018, issued in Singapore Application No. 11201708641X.
Office Action dated Jun. 12, 2018, issued in Japanese Application No. 2017-521685.
Karsten Voigt et al; C-Band Optical 90° C. Hybrids in Silicon Nanowaveguide Technology; IEEE Photonics Technology Letters, vol. 23, No. 23, pp. 1769-1771, Dec. 1, 2011.
Kai-Ning Ku et al; Wide-Band Optical Mode Converters for Coupling Between Fibers and Silicon Photonic Wires with Large Misalignment Tolerance; Journal of Lightwave Technology, vol. 31, No. 10, pp. 1616-1620, May 15, 2013.
Extended Search Report dated Apr. 12, 2018 in corresponding EP Patent Application No. 16802791.0.
Kuanping Shang et al., "Ultra-Low loss vertical optical couplers for 3D photonic integrated circuits", OFC 2015, Mar. 22, 2015, Th1F.6.
Rong Sun et al., "Impedance matching vertical optical waveguide couplers for dense high index contrast circuits", Optics Express, Jul. 21, 2008, vol. 16, No. 16, pp. 11682-11690.

* cited by examiner

COHERENT OPTICAL MIXER CIRCUIT

TECHNICAL FIELD

The present invention relates to a coherent-type optical communication technique. In particular, the invention relates to a coherent optical mixer circuit including a monitor mechanism to evaluate a phase error.

BACKGROUND ART

In recent years, in a long distance optical communication in particular, a digital coherent-type optical transmission system has been developed that can dramatically increase the communication capacity per one channel and has been increasingly put into commercial use. The digital coherent-type communication generally uses a polarization multiplexing method to give different signals to two polarizations orthogonal to each other to double the transmission capacity.

FIG. 1 illustrates the configuration of an optical reception circuit (optical polarization separation/demodulation circuit) 9100 of a typical digital coherent polarization multiplexing method according to the related art. A coherent-type optical transmission circuit and an optical reception circuit are characterized in having a light source also at the reception side so that the standard light (reference light) inputted from this light source is allowed to interfere with a signal light inputted from a transmission path to thereby detect the signal with a higher sensitivity.

In FIG. 1, the arrow shown by the solid line at the left end shows the standard light inputted from the light source while the arrow shown by the dotted line shows the signal light inputted from the transmission path. FIG. 1 illustrates a polarization beam splitter 9101, a polarization rotator 9102, the second optical power splitter 9103, a coherent optical mixer 9104 functioning as the first light demodulation circuit, a coherent optical mixer 9105 functioning as the second light demodulation circuit, and photo detectors 9106 and 9107.

The polarization multiplexed signal light (dotted line) inputted from the transmission path is received by light receptor 9100 and is separated by the polarization beam splitter 9101 to TE polarized light and TM polarized light components. The continuous light (solid line) of the TE polarized light functioning as the standard light is inputted from a not-shown light source and is branched by the second optical power splitter 9103 to two components. The TE polarized light component of the separated signal light and the standard light of one branched TE polarized light are demodulated by the coherent optical mixer 9104. The TM polarized light component of the separated signal light is converted by the polarization rotator 9102 to TE polarized light. The resultant TE polarized light and the standard light of the other branched TE polarized light are inputted to the coherent optical mixer 9105 and are demodulated. The demodulated light signal is converted by the photo detectors 9106 and 9107 to a reception electric signal and the resultant signal is outputted.

The polarization beam splitter 9101, the polarization rotator 9102, the second optical power splitter 9103, and the coherent optical mixers 9104 and 9105 are generally realized on one chip by a waveguide-type light integrated circuit. The waveguide is composed of material such as semiconductor such as quartz or indium phosphide or silicon. A semiconductor or silicon light integrated circuit is also realized by being integrated to include the photo detectors 9106 and 9107.

Each of the coherent optical mixers 9104 and 9105 is a light circuit having 2 inputs and 4 outputs in which the maximum interference is obtained when two inputted light waves have a phase angle difference of 0, 90, 180, and 270 degrees. Interference light waves are outputted depending on the phase angle difference from the respective 4 outputs. The coherent optical mixers 9104 and 9105 have a light demodulation characteristic that is determined based on a level (or a phase error) at which the phase angle difference actually causing the maximum interference is displaced from phase angle differences of 0, 90, 180, and 270 degrees causing the maximum interference from the design viewpoint. A coherent optical mixer actually applied to an optical reception circuit must have a phase error lower than a specified standard value. Currently, a general phase error is specified to be ±5 degrees or less.

This phase error is a characteristic that is easily influenced by a manufacture variation. Thus, in the manufacture of a coherent optical mixer, the phase error must be evaluated and a circuit satisfying a set standard must be selected. The phase error is evaluated generally using a delay circuit.

FIG. 2 is a plan view illustrating the configuration of a chip 9210 of a coherent optical mixer circuit in which a delay circuit is added for the evaluation of the phase error. FIG. 2 illustrates the coherent optical mixer circuit 9104 of FIG. 1, an input waveguide 9200, a light splitter 9201, the first and second arm waveguides 9202 and 9203 constituting the delay circuit, two input waveguides 9204 and 9205 to the coherent optical mixer circuit 9104, and four interference light outputs 9206, 9207, 9208, and 9209. When the delay circuit portion of the chip is cut away after the evaluation of the phase error, the chip is cut apart along a cutaway standard line 9211 (shown as a dashed dotted line).

FIG. 3 is a plan view illustrating one example of the waveguide configuration of the coherent optical mixer circuit 9104 of FIG. 2. In FIG. 3, the two input waveguides and the four output waveguides are designated by the same reference numerals as those of FIG. 2.

In FIG. 3, the interference portion of the coherent optical mixer circuit 9104 is composed of a 1×2 optical coupler 9301, three 2×2 optical couplers 9302, 9304, and 9305, and four waveguides 9303 having an equal length for connecting them.

FIG. 4 is a plan view illustrating another example of the waveguide configuration of the coherent optical mixer circuit 9104 of FIG. 2. In FIG. 4, the two input waveguides and the four output waveguides are designated by the same reference numerals as those of FIG. 2.

In FIG. 4, the interference portion of the coherent optical mixer circuit 9104 is composed of a single multimode interference circuit (Multi-Mode Interferometer: MMI) 9401. An interference light output is obtained based on predetermined phase difference conditions determined by the differences of the light paths from two input ports to the four outputs ports, respectively, of the MMI chip 9401 to which the signal light and the reference light are inputted. A coherent optical mixer configured by a single MMI has been conventionally reported, an example of which is described in detail in the following Non Patent Literature 1.

FIGS. 5A and 5B illustrate the transmission spectra of monitor lights outputted from the respective four output waveguides 9206, 9207, 9208, and 9209 when monitor light is inputted from the input waveguide 9200 for the evaluation of the phase error in the coherent optical mixer circuit in the chip 9210 added with the delay circuit of FIG. 2. FIGS. 5A and 5B illustrate that the spectra shown by OUT #1, OUT

2, OUT #3, OUT #4 illustrate the transmission spectra of the monitor lights to the output waveguides 9206, 9207, 9208, and 9209, respectively.

The inputted monitor light for the phase error evaluation is branched to two lights. The resultant two lights are inputted to the MMI with a delay time difference given in the delay circuit and are interfered and outputted. Thus, the configuration of FIG. 2 forms a Mach-Zehnder interference circuit and shows a frequency characteristic (light transmission spectrum) having a cyclic drop determined by the delay time difference.

As shown in FIGS. 5A and 5B, the monitor lights outputted from the four respective output ports of the MMI basically have the same shape of light transmission spectrum. However, the light transmission spectra are displaced by about ¼ cycle in the frequency axis direction depending on the interference phase difference conditions of the four output ports.

FIG. 5A shows the monitor light transmission spectra when the coherent optical mixer circuit shown in FIG. 3 is used. FIG. 5B shows the monitor light transmission spectra when the coherent optical mixer circuit shown in FIG. 4 is used.

The phase error is evaluated by analyzing these transmission spectra. Specifically, when the interference conditions at the four outputs completely match the phase angle differences of 0, 90, 180, and 270 degrees, the maximum transmission frequency (or the maximum quenching frequency) of the transmission spectra of the respective outputs are arranged to have an equal interval in the light frequency axis direction. Thus, the phase error can be obtained by confirming the frequency array having an equal interval and the actual displacement of the transmission (or quenching) frequency.

In FIG. 5A, showing the spectra of the coherent optical mixer circuit of FIG. 3, OUT #1 and OUT #2 adjacent to each other and OUT #3 and OUT #4 adjacent to each other have the phase angle differences of the interference conditions relatively different from each other by 180 degrees, respectively. On the other hand, in FIG. 5B, showing the spectra of the coherent optical mixer circuit of FIG. 4, OUT #1 and OUT #4, OUT #2 and OUT #3 have the phase angle differences of the interference conditions relatively different from each other by 180 degrees, respectively.

In the case of a coherent optical mixer circuit that is a light demodulation circuit in the related art, the chip connected to the delay circuit as shown in FIG. 2 is prepared. The transmission spectra as shown in FIGS. 5A and 5B are measured and analyzed to thereby evaluate the phase error and to select a favorable chip. Since the delay circuit is not used in an optical reception circuit, the chip is cut apart along the cut away standard line 9211 of FIG. 2 after the evaluation and selection, and is used for the optical reception circuit.

CITATION LIST

Patent Literature

PTL 1: Japanese Patent No. 4410149

Non Patent Literature

NPL 1: H.-G. Bach, et al. "Monolithic 90° Hybrid with Balanced PIN Photodiodes for 100 Gbit/s PM-QPSK Receiver Applications," Tech. Digest OFC 2009, paper OMK5 (2009)

SUMMARY OF INVENTION

The light demodulation circuit and the optical reception circuit as described above have disadvantages as described below.

In a coherent optical mixer circuit functioning as a light demodulation circuit, the chip connected to the delay circuit as shown in FIG. 2 is prepared and the phase error is evaluated after which the delay circuit is cut away and the processing proceeds to a step of assembling an optical reception circuit. The first disadvantage is the need of a step of cutting away an unnecessary delay circuit, which requires additional manufacture time and cost. The second disadvantage is that the cut away delay circuit part of the chip is disposed, which causes the loss of circuit area, thus undesirably causing a reduced chip yield per one wafer.

The present invention has been made in view of the disadvantages as described above. It is an objective of the invention to provide a light demodulation circuit and an optical reception circuit by which the phase error can be measured without requiring a step of cutting away a delay circuit and to provide a coherent optical mixer circuit by which the phase error can be measured in a wafer status prior to the chip cutting process.

In order to solve the above disadvantages, the coherent optical mixer circuit according to the present invention has the following configuration.

Configuration 1 of the Invention

A coherent optical mixer circuit including a 4-input-and-4-output multimode interference circuit having a silicon waveguide in which the multimode interference circuit has two odd-numbered or even-numbered inputs that are connected to an input mechanism of externally-inputted signal light and reference light via input waveguides and the four outputs of the multimode interference circuit are all connected to an output mechanism to the exterior via output waveguides, wherein:

other two inputs of the multimode interference circuit are connected to two monitor waveguides,
  one of the monitor waveguide is longer than the other of the monitor waveguide to configure a light delay circuit,
  the monitor waveguides constituting the light delay circuit are connected to respective outputs of a 2-branched light splitter, and
  the 2-branched light splitter has an input connected to a monitor light input mechanism from the exterior via monitor input waveguide.

Configuration 2 of the Invention

The coherent optical mixer circuit according to Configuration 1, wherein:
  the output waveguides of the multimode interference circuit includes a waveguide intersection.

Configuration 3 of the Invention

The coherent optical mixer circuit according to Configuration 1, wherein:
  at least one of the signal light and reference light input mechanism, the monitor light input mechanism, and the output mechanism comprises a grating coupler.

Configuration 4 of the Invention

The coherent optical mixer circuit according to Configuration 1, wherein:
  at least a part of the monitor waveguide is formed by a silicon waveguide,
  the remaining portion of the monitor waveguide and the 2-branched light splitter connected to the monitor waveguide and the monitor input waveguide, and the monitor light input mechanism connected to the monitor input waveguide are formed by a light waveguide formed in another layer different from that of the silicon waveguide, and a part of the monitor waveguide formed by the silicon waveguide and the light waveguide of another layer different from that of the silicon waveguide are interlayer-coupled.

Configuration 5 of the Invention

The coherent optical mixer circuit according to Configuration 1, wherein:

the output mechanism is connected to a photo detector.

Configuration 6 of the Invention

The coherent optical mixer circuit according to Configuration 5, wherein:

the photo detector has a subsequent stage including a grating coupler, and light not absorbed by the photo detector is outputted from the grating coupler.

Configuration 7 of the Invention

A polarization separation-type coherent optical mixer circuit including two coherent optical mixer circuits according to configuration 1 of the invention, wherein:

the reference light inputted from the input mechanism is 2-branched by a light splitter and the resultant lights are inputted to two coherent optical mixer circuits, respectively, the signal light inputted from the input mechanism is optical polarization-separated by a polarization beam splitter, one polarized signal light obtained through the optical polarization-separation is inputted to the first coherent optical mixer circuit, the other polarized signal light obtained through the optical polarization-separation is inputted to the second coherent optical mixer circuit via a polarization rotation circuit, monitor lights are inputted from two monitor light input mechanism to two coherent optical mixer circuits, respectively, and the polarization separation-type coherent optical mixer circuit has a coherent-type polarization diversity configuration.

According to the present invention as described above, a coherent optical mixer circuit can be provided that can provide the measurement of a phase error without requiring a step of cutting away a delay circuit. In addition, a coherent optical mixer circuit can be provided by which the phase error can be measured in a wafer status prior to the chip cutting process.

DESCRIPTION OF EMBODIMENTS

The following section will describe an embodiment of the present invention with reference to the drawings.

The present invention uses a 4-input-and-4-output MMI circuit (multimode interference circuit) as a coherent optical mixer circuit. Attention should be paid on a point that two input ports are used as a coherent optical mixer among the four input ports of the MMI and thus additional two input ports can be provided to measure the phase error.

In this case, the input ports that can be used to input a signal light and a standard light as a coherent optical mixer are limited due to the light interference conditions. When assuming the four input ports of the MMI chip as the 1st, 2nd, 3rd, and 4th inputs in an arrangement order from one arbitrary end of the chip, then the 1st one and the 3rd one or the 2nd one and the 4th one of the four inputs of the MMI (i.e., odd-numbered inputs or even-numbered inputs) must be used for a coherent optical mixer to input the signal light and the standard light.

In the present invention, in the MMI of the coherent optical mixer circuit, two input ports not used to input the signal light and the standard light (i.e., the 2nd one and the 4th one or the 1st one and the 3rd one) (or even-numbered inputs or odd-numbered inputs) are added, and a delay circuit and a monitor input waveguide are added thereto so as to be able to receive monitor light. This consequently provides input ports for an interference circuit for the phase error evaluation in addition to the input port used in the coherent optical mixer circuit, thus eliminating the step of cutting away the interference circuit after the evaluation of the phase error.

First Embodiment

The following section will describe the light demodulation circuit according to the first embodiment of the present invention.

Figure 6:
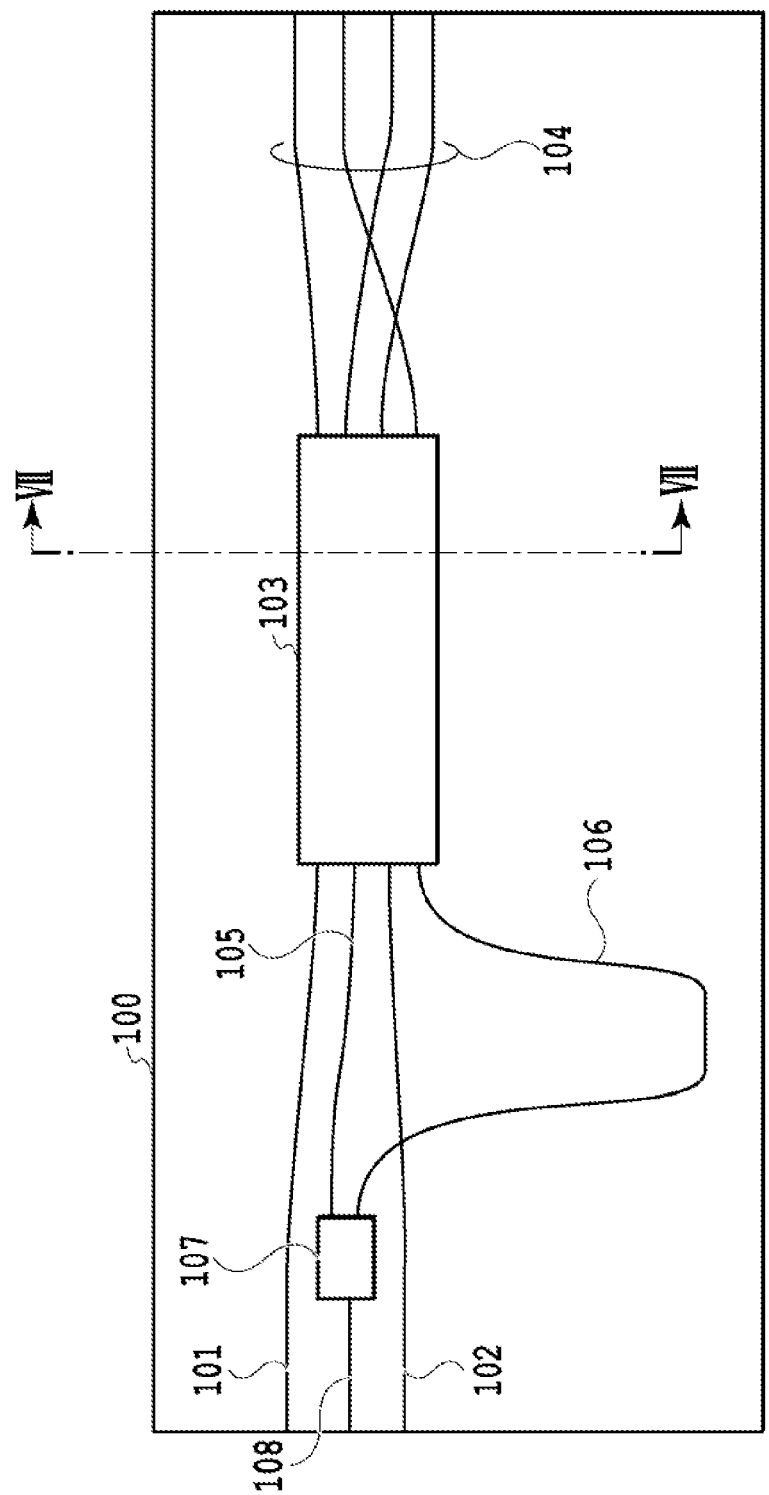
FIG. 6 is a plan view illustrating the configuration of the coherent optical mixer circuit in the first embodiment of the present invention.

FIG. 6 is a plan view illustrating a coherent optical mixer circuit 100 that is a light demodulation circuit in Embodiment 1. FIG. 6 illustrates input waveguides 101 and 102, an MMI circuit 103 having 4-input-and-4-output design, and output waveguides 104 (generic numbered) constituting 4 ports.

The input waveguides 101 and 102 for signal light and standard light are connected to the 1st input and the 3rd input of the MMI circuit 103 from the upper side of the drawing, respectively. In FIG. 6, a monitor input waveguide 108 at the left end in the drawing receives the monitor light for the phase error evaluation from an external monitor light input mechanism. The monitor light is 2-branched by a light splitter 107 and the resultant lights are send via two monitor waveguides 105 and 106 forming a delay circuit and are connected to the 2nd and 4th inputs of the MMI circuit 103 from the upper side of the drawing, respectively.

Figure 1:
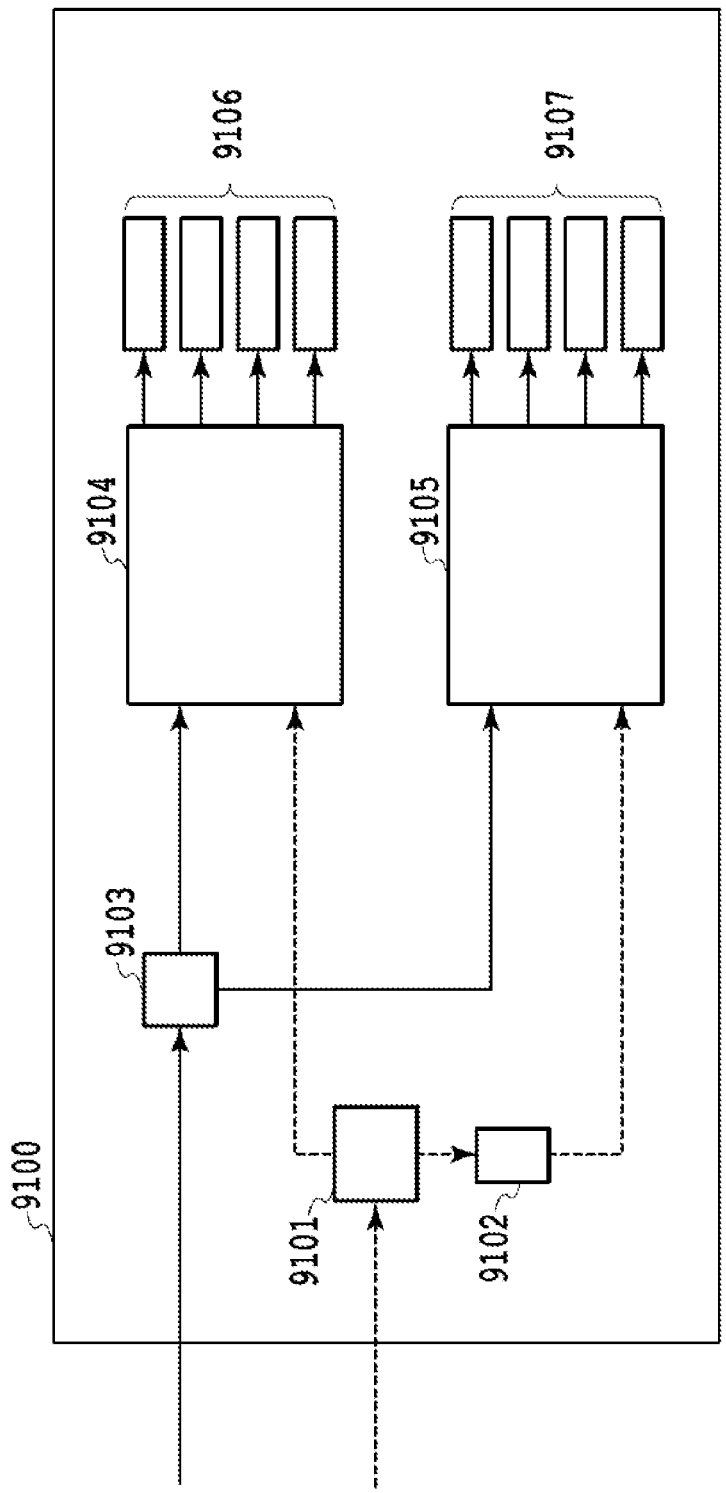
FIG. 1 illustrates a general configuration of a conventional coherent optical reception circuit.
Figure 2:
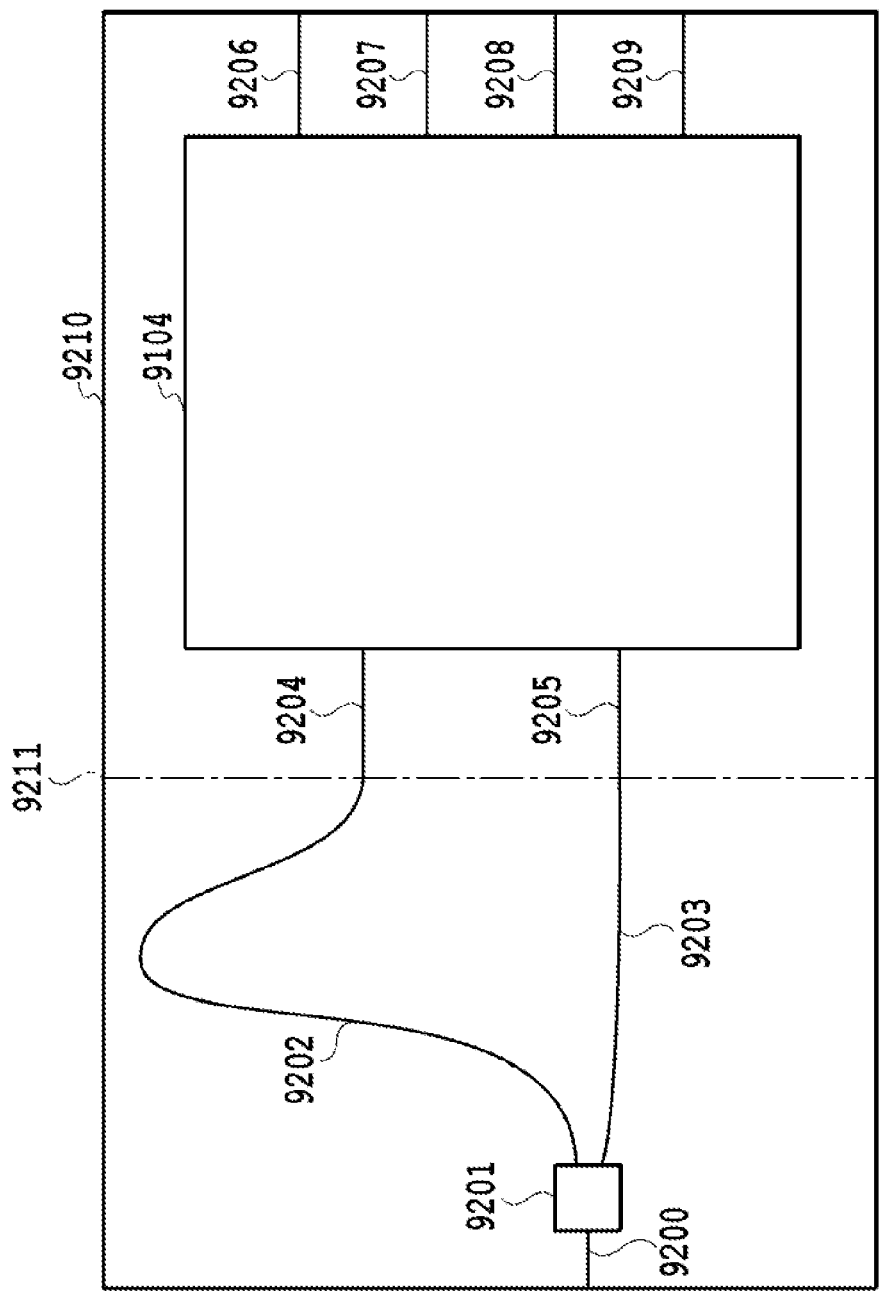
FIG. 2 illustrates a chip configuration of a coherent optical mixer circuit to which a delay circuit is added for the evaluation of a phase error.
Figure 3:
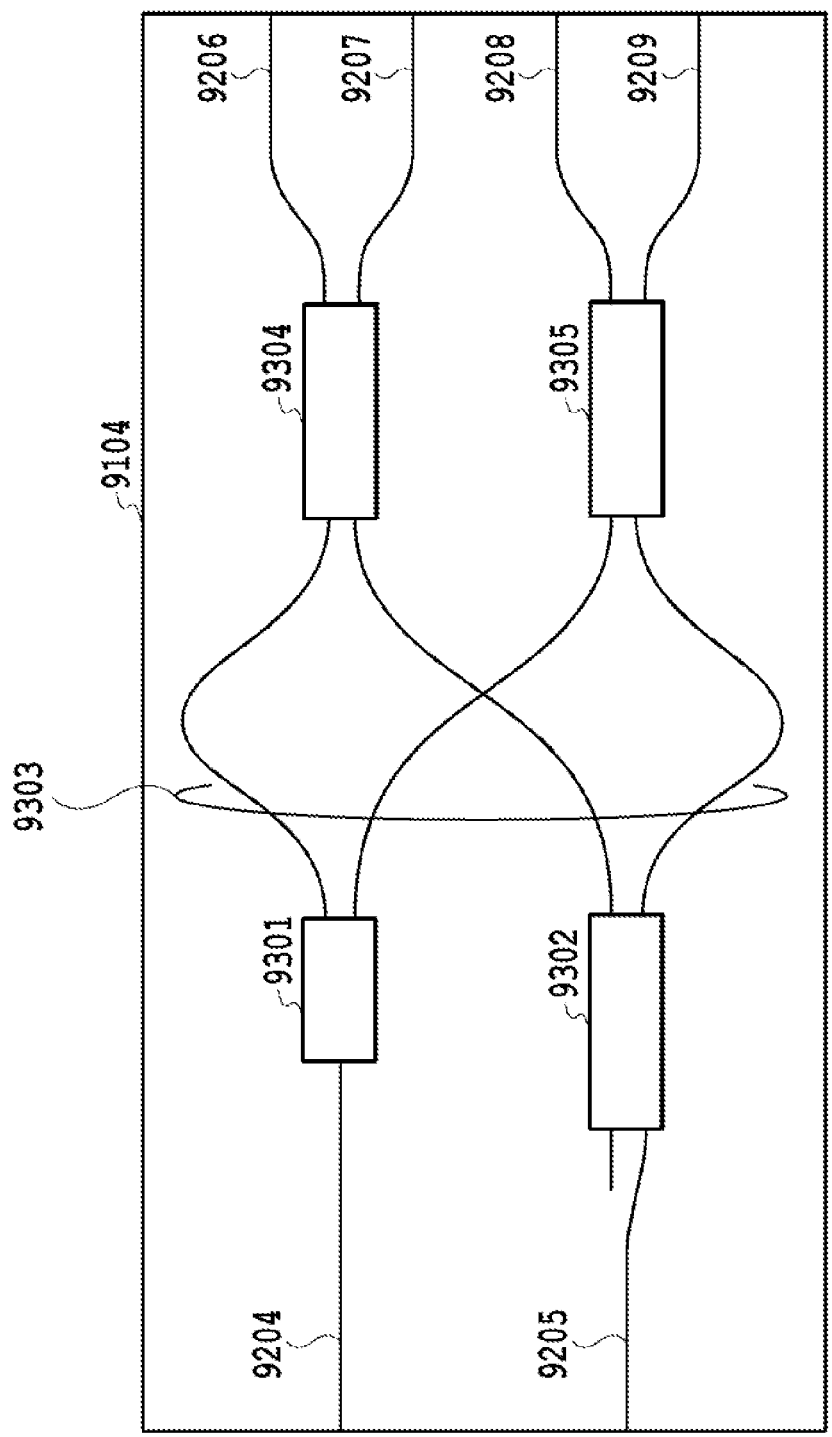
FIG. 3 illustrates a configuration example of the coherent optical mixer circuit.
Figure 4:
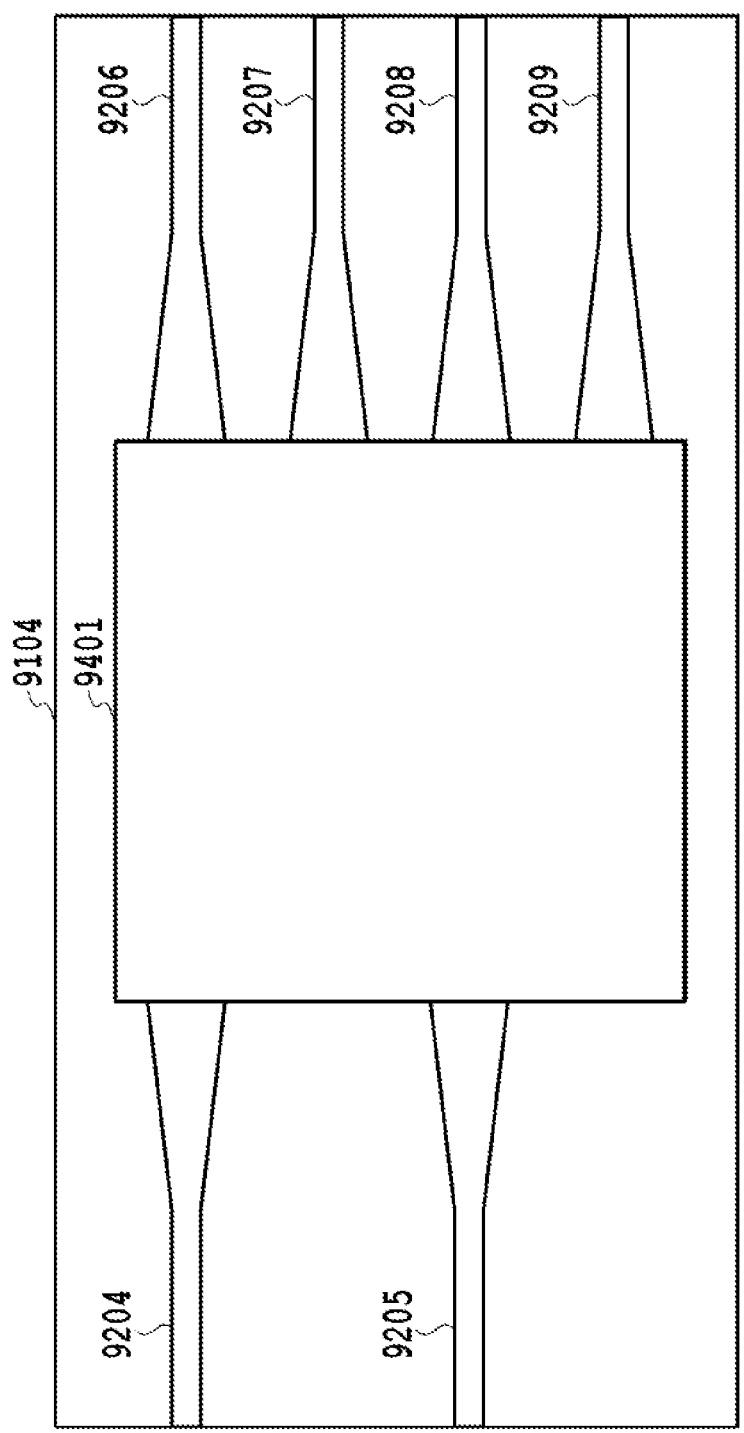
FIG. 4 illustrates another configuration example of the coherent optical mixer circuit.
Figure 5A:
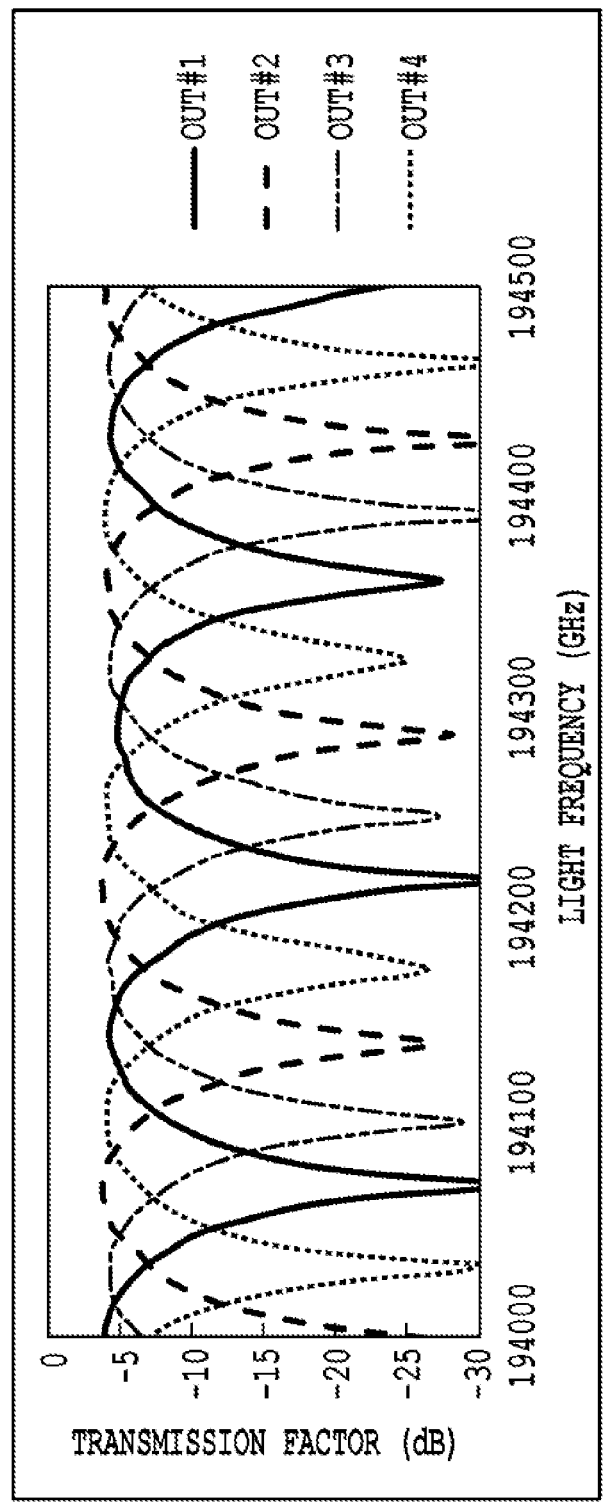
FIG. 5A illustrates the monitor light transmission spectra of the coherent optical mixer circuit shown in FIG. 3 to which a delay circuit is added.
Figure 5B:
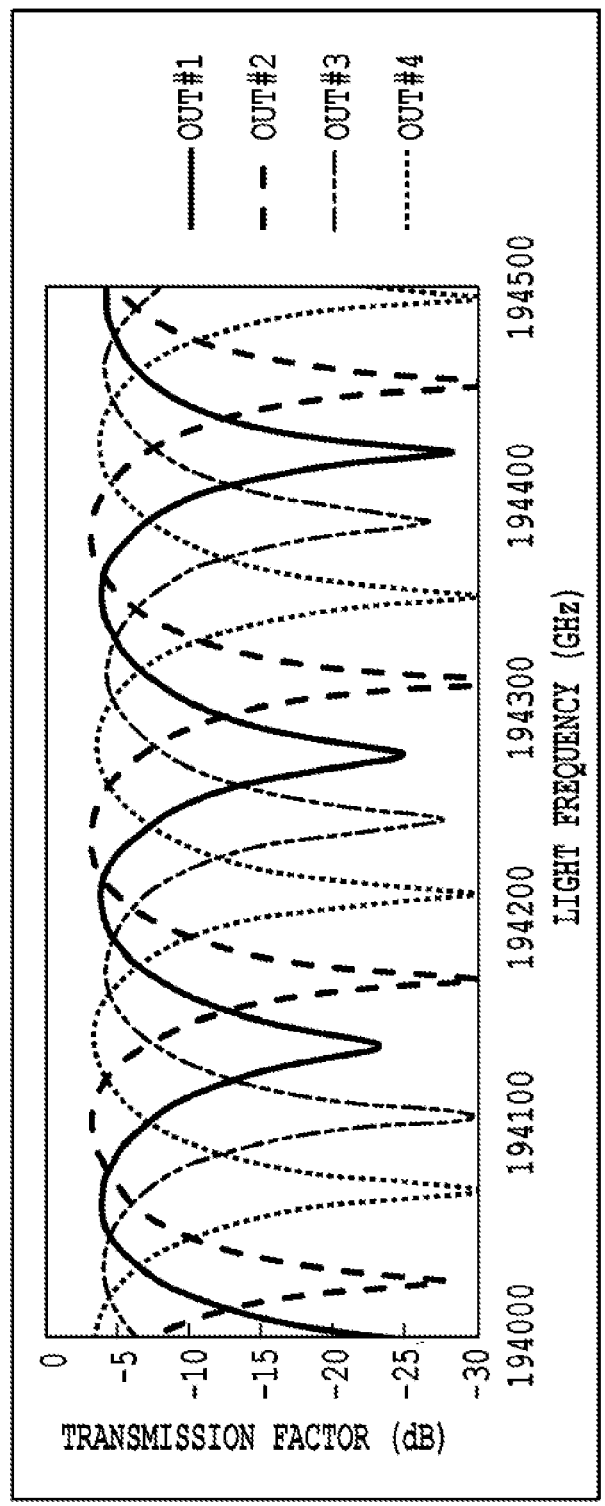
FIG. 5B illustrates the monitor light transmission spectra of the coherent optical mixer circuit shown in FIG. 4 to which the delay circuit is added.

As can be seen from FIG. 6, the two monitor waveguides 105 and 106 forming the delay circuit are configured so that one monitor waveguide 106 is longer than the other monitor waveguide 105 so as to cause a delay time difference, thereby generating the monitor light transmission spectrum for the phase error evaluation as shown in FIGS. 5A and 5B.

The respective waveguides 101, 102, 104, 105, 106, and 108 are designed so that the waveguide core width is 0.5 µm and the MMI circuit has a core width of 6 µm and has a length of 55 µm.

As shown in FIG. 6, the output waveguides 104 of the 4 ports are arranged in an order of 1, 2, 3, and 4 at the output end of the MMI circuit 103. However, the waveguides are including a waveguide intersection, they are rearranged in an order of 1, 4, 2, and 3 at the output end of the coherent optical mixer circuit 100. The order of the connection is not limited to that of this example. The reason why the output waveguides include a waveguide intersection is that, when the output lights from the 4 ports of the coherent optical mixer 100 are received by the photo detectors, then such an array is required that allows 2 ports adjacent to each other thereamong to have a light phase difference of 180 degrees, respectively. Among the outputs of the 4 ports from the MMI circuit 103, the 1st one and the 4th one, the 2nd one and the 3rd one in an order from the upper side have a light phase difference of 180 degrees, respectively. Thus, the outputs are rearranged in the above order by the waveguide intersection.

Figure 7:
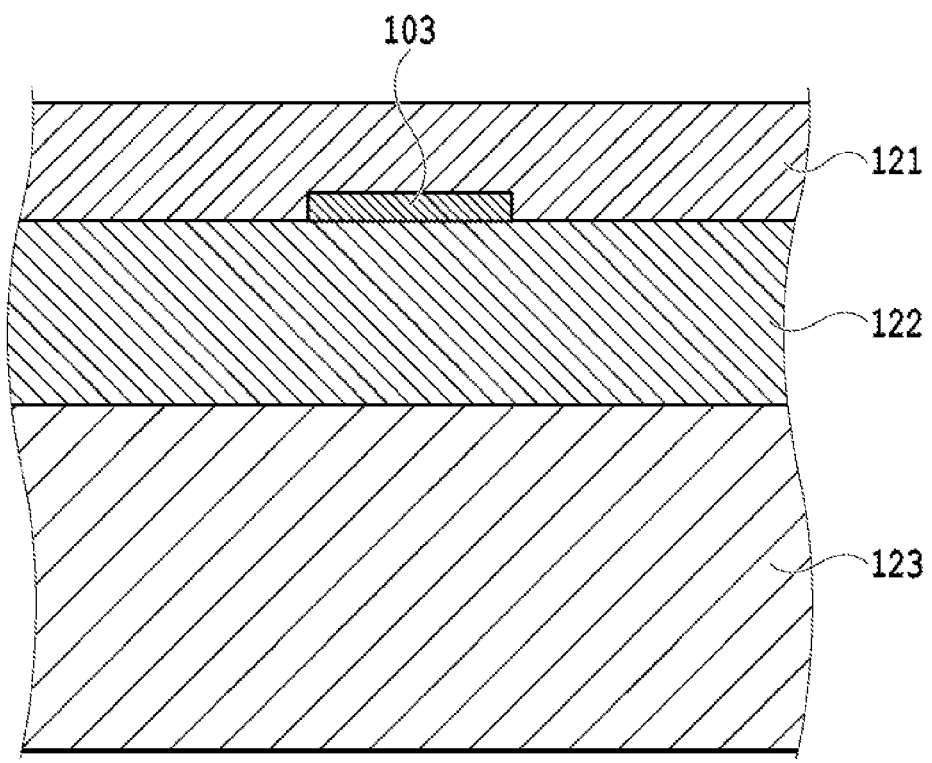
FIG. 7 is a cross-sectional view taken along the line segment VII in the MMI circuit of FIG. 6.

FIG. 7 illustrates the circuit structure at the VII cross section of the MMI circuit 103 of FIG. 6. The MMI circuit 103 shown in FIG. 7 is a waveguide core and is formed by silicon. An upper clad 121 and a lower clad 122 are both formed by quartz glass and are layered on a silicon substrate 123. The waveguide 103 has a core thickness of 0.22 µm, the upper clad 121 has a thickness of 1.5 µm, and the lower clad 122 has a thickness of 2 µm.

Figure 8:
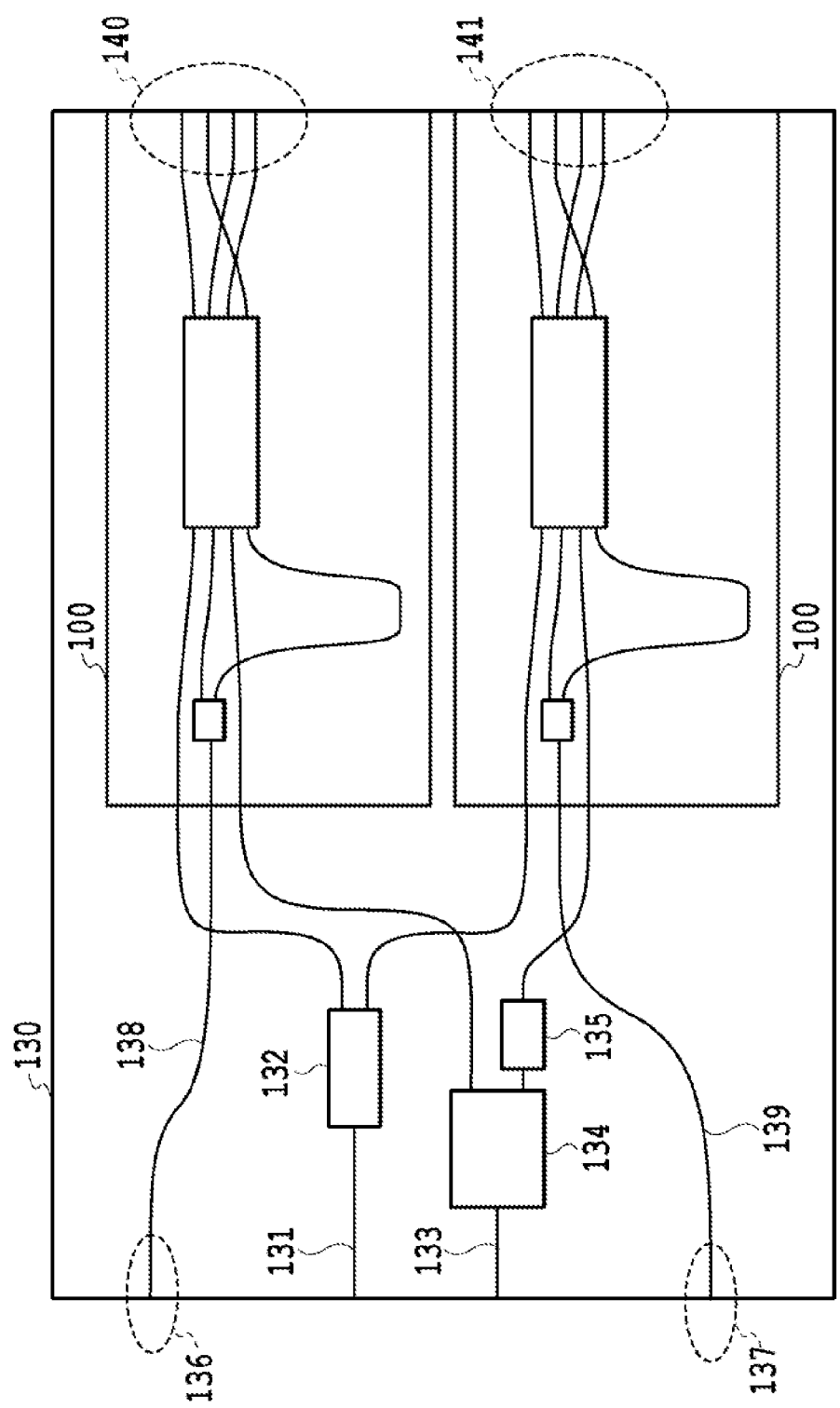
FIG. 8 is a plan view illustrating the configuration of an optical polarization separation/demodulation circuit to which the coherent optical mixer circuit of FIG. 6 is applied.

FIG. 8 is a plan view illustrating the configuration of an optical polarization separation/demodulation circuit 130 that is an optical reception circuit having a polarization diversity configuration using two coherent optical mixer circuits 100 of FIG. 6. Of course, one coherent optical mixer circuit of FIG. 6 also can configure a coherent optical demodulation circuit not having a polarization diversity configuration.

FIG. 8 illustrates input waveguides 131 and 133, a 2-branched light splitter 132, a polarization beam splitter 134, and a polarization rotation circuit 135. The two coherent optical mixers 100 are as shown in FIG. 6.

The optical reception circuit 130 of FIG. 8 has a polarization diversity configuration using two coherent optical mixers 100. The optical reception circuit 130 can be recognized as a polarization separation-type coherent optical mixer circuit in which a light signal inputted from the transmission path to the input waveguide 133 is separated by the polarization beam splitter 134 to TE and TM polarized light components.

The separated TM polarized light component of the signal light is converted to a TE polarized light component in the polarization rotation circuit 135. The separated TE and TM polarized light components of the signal light are consequently both inputted as two TE polarized light to two coherent optical mixers 100, respectively.

On the other hand, locally-generated light (standard light, reference light) inputted to the input waveguide 131 is a TE polarized light, and is distributed to two TE polarized lights by the light splitter 132. Both of the local TE polarized lights are inputted to the two coherent optical mixers 100, respectively.

The respective four output ports of the two coherent optical mixers 100 are structured so that output mechanisms 140 and 141 are used to output lights from the chip end face to the exterior. The output lights are received by externally-provided photo detectors. The two coherent optical mixers 100 have monitor input waveguides 138 and 139 reaching to the chip end face at input mechanisms 136 and 137. Monitor input waveguides 138 and 139 include waveguide intersection, respectively.

Figure 9:
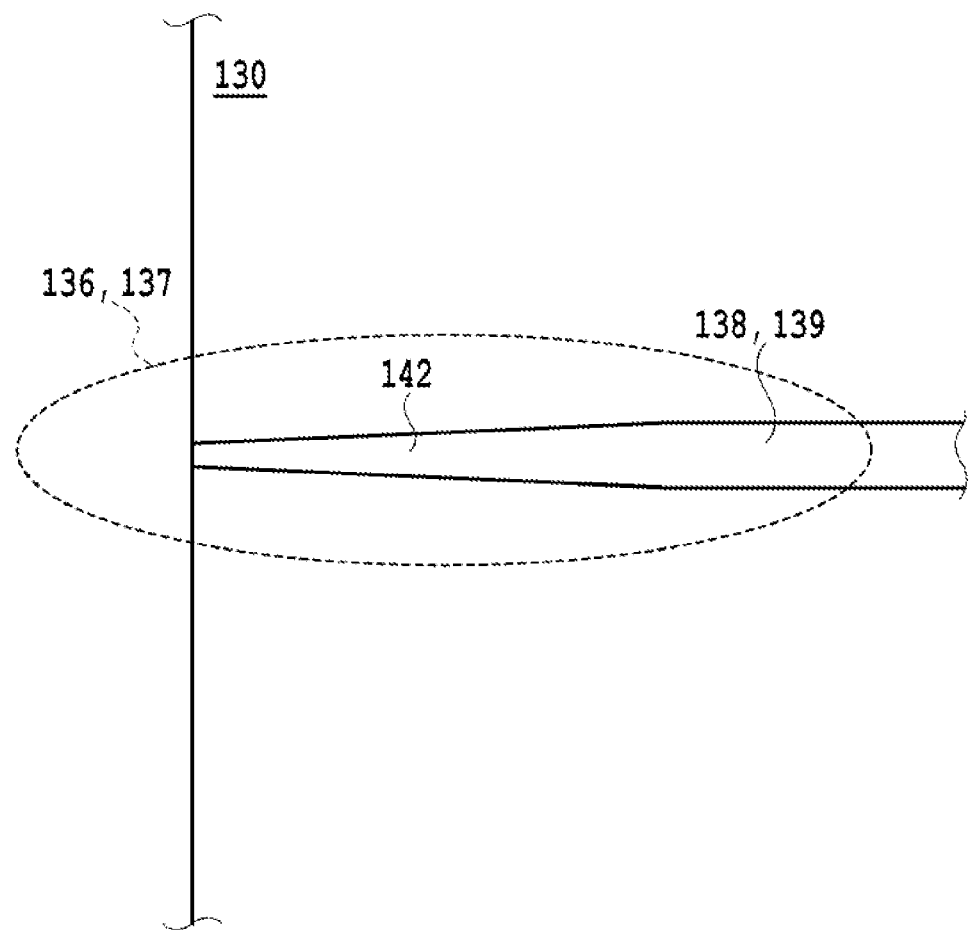
FIG. 9 illustrates a configuration example of the input mechanism of FIG. 8.

FIG. 9 illustrates the configuration example of the input mechanisms 136 and 137 of FIG. 8 in which the chip end has an inverse tapered waveguide 142 having a tapered tip end. The tip end of the inverse tapered waveguide 142 has a waveguide core width of 0.15 µm. This structure provides a relatively-reduced light confinement in the silicon light waveguide at the chip end face to thereby increase the light mode diameter, thus realizing a relatively-high coupling efficiency with external optical fibers.

Figure 10:
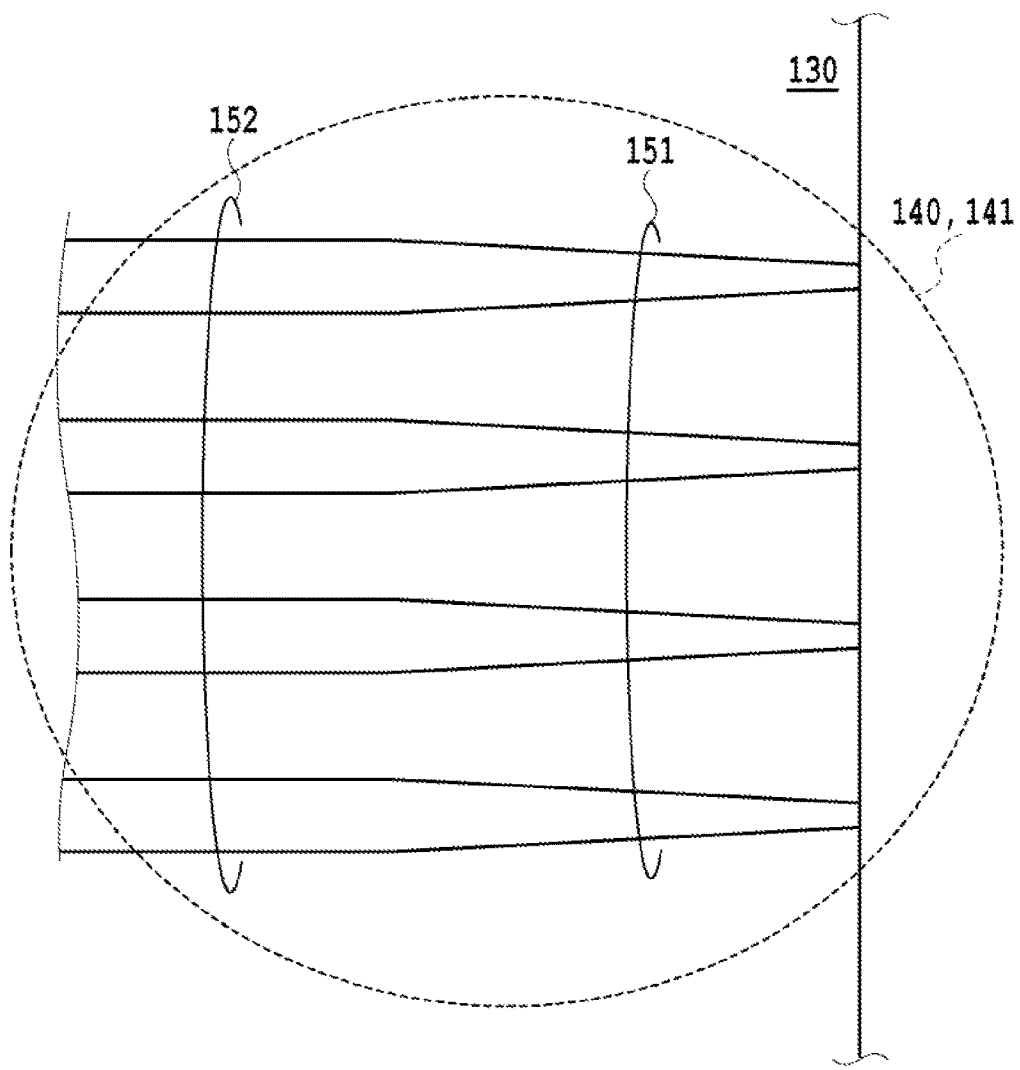
FIG. 10 illustrates a configuration example of the output mechanism of FIG. 8.

FIG. 10 illustrates the configuration example of the output mechanisms 140 and 141 of FIG. 8 in which the chip end similarly has an inverse tapered waveguide 151 having a tapered tip end. The tip end of the inverse tapered waveguide 151 has a waveguide core width of 0.15 µm. This structure provides a relatively-reduced light confinement in the silicon light waveguide at the chip end face to thereby increase the light mode diameter, thus realizing a relatively-high coupling efficiency with external optical fibers.

Figure 11:
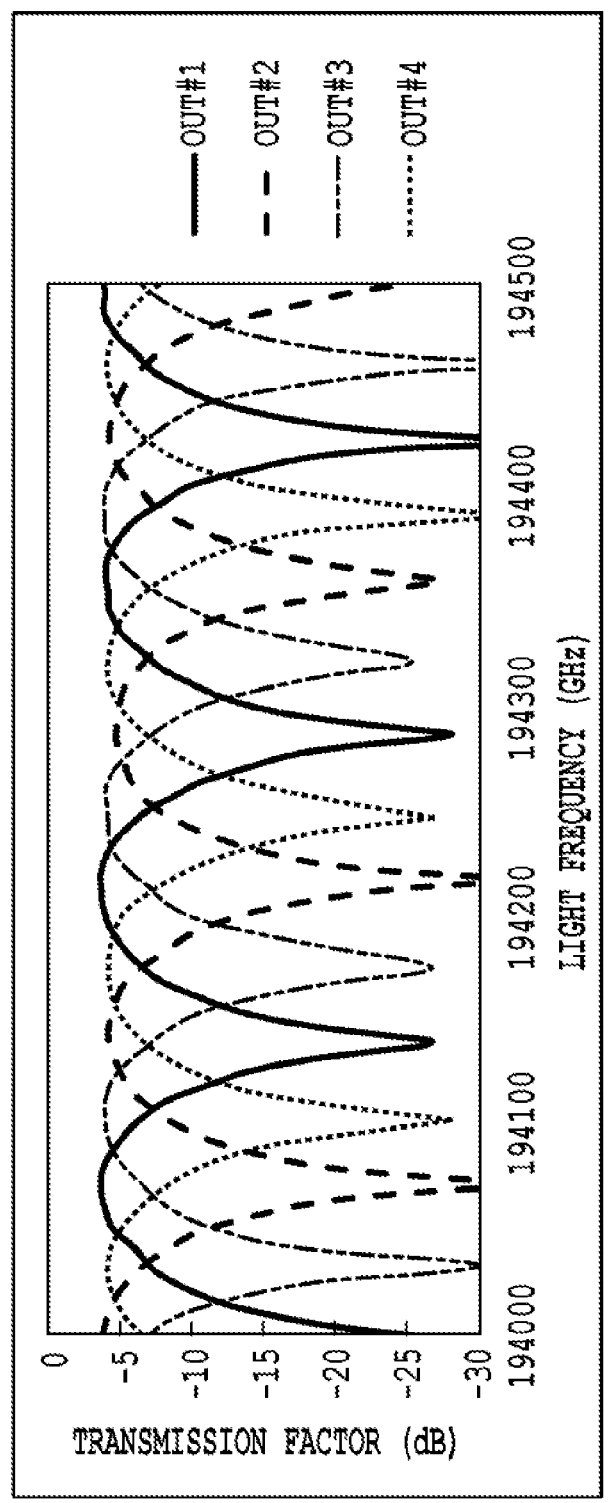
FIG. 11 illustrates the monitor light transmission spectra to the respective output mechanisms of the passage from the input mechanism through the coherent optical mixer circuit in FIG. 8.

FIG. 11 illustrates the transmission spectra of the monitor lights inputted from the input mechanism 136 or 137 and outputted from the four output waveguides of the output mechanism 140 or 141, respectively, in the optical polarization separation/demodulation circuit 130 of FIG. 8. The spectra of OUT #1, OUT #2, OUT #3, and OUT #4 are shown in an order from the top of the output waveguides of the output mechanisms 140 or 141. This Embodiment 1 can provide, in addition to the input of the signal light and the locally-generated light, the input of the monitor light from the input mechanism 136 or 137. The resulting spectra can provide the analysis of the interference conditions at the four outputs of the coherent optical mixer circuit as in the related art and can realize the evaluation of the phase error characteristic of the coherent optical mixer circuit.

Specifically, according to the light demodulation circuit of Embodiment 1, without providing a delay circuit at the input unit of the signal light and the locally-generated light as in the related art, the monitor light inputted through another input mechanism 136 or 137 can be used to evaluate the phase error characteristics of two coherent optical mixer circuits. The input mechanism 136 or 137 as well as the light splitter 107 and the delay circuits 105 and 106 at the subsequent stage thereof do not have any influence on the actual operation of the optical reception circuit and are do not have to be removed.

In addition, since the silicon light waveguide can be designed so that the waveguide has a bending radius of a few lam, the waveguide can have an increased layout freedom, thus allowing the light splitter 107 and the delay circuits 105 and 106 and a monitor waveguide connected thereto to be connected without causing a substantial increase of the chip size.

As described above, Embodiment 1 can realize a coherent optical mixer circuit that allows the evaluation of the phase error characteristic and that eliminates the need for a step of cutting away a delay circuit.

Second Embodiment

The following section will describe a light demodulation circuit according to the second embodiment of the present invention. The coherent optical mixer circuit in this embodiment has a main configuration as in Embodiment 1 and has similar design parameters for the waveguides and the MMI circuit as in Embodiment 1. However, Embodiment 2 is different from Embodiment in that the former has the input mechanism and the output mechanism having different configurations from those of Embodiment 1.

Figure 12:
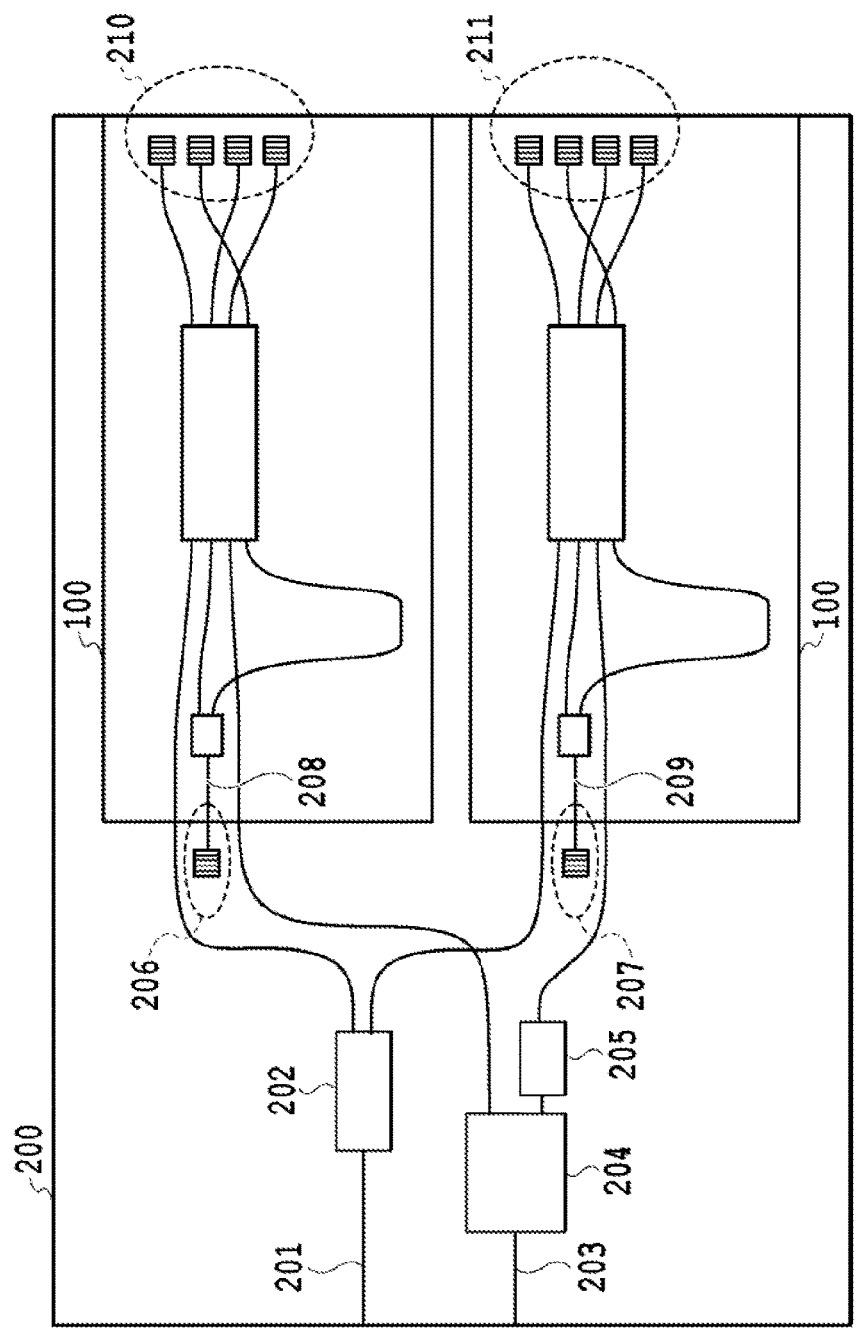
FIG. 12 is a plan view illustrating the configuration of the optical polarization separation/demodulation circuit to which the coherent optical mixer circuit is applied in the second embodiment of the present invention.

FIG. 12 is a plan view illustrating the configuration of an optical polarization separation/demodulation circuit 200 to which the coherent optical mixer circuit 100 is applied in Embodiment 2. The coherent optical mixer circuit 100 has a configuration as shown in FIG. 6 in Embodiment 1. FIG. 12 illustrates input waveguides 201 and 203, a 2-branched light splitter 202, a polarization beam splitter 204, and a polarization rotation circuit 205. As in Embodiment 1, the polarization diversity configuration using the two coherent optical mixer circuits 100 is used in which the light signal inputted from the transmission path to the input waveguide 203 is separated by the polarization beam splitter 204 to TE and TM polarized light components. The separated TM polarized light component of the signal light is converted to a TE polarized light component in the polarization rotation circuit 205. The separated TE and TM polarized light components of the signal light are consequently both inputted as two TE polarized light to the two coherent optical mixers 100, respectively.

On the other hand, the locally-generated light (standard light, reference light) inputted to the input waveguide 201 is a TE polarized light, and is distributed to two TE polarized lights by the light splitter 202. Both of the local TE polarized lights are inputted to the two coherent optical mixers 100, respectively.

In Embodiment 2, the respective four output ports of the two coherent optical mixers 100 are structured so that grating couplers 210 and 211 functioning as output mechanisms. These grating couplers output lights in a substantially vertical direction of the chip circuit substrate face (or in the backward direction of the view). The output lights thereof are received by photo detectors (not shown) provided at the upper side of the chip circuit substrate.

The two coherent optical mixer circuits 100 have additional input waveguides. They are coupled to the light input (e.g., optical fibers) provided at the upper side of the exterior of the chip circuit substrate via monitor waveguides 208 and 209 and by way of grating couplers 206 and 207 functioning as a monitor light input mechanism.

Figure 13A:
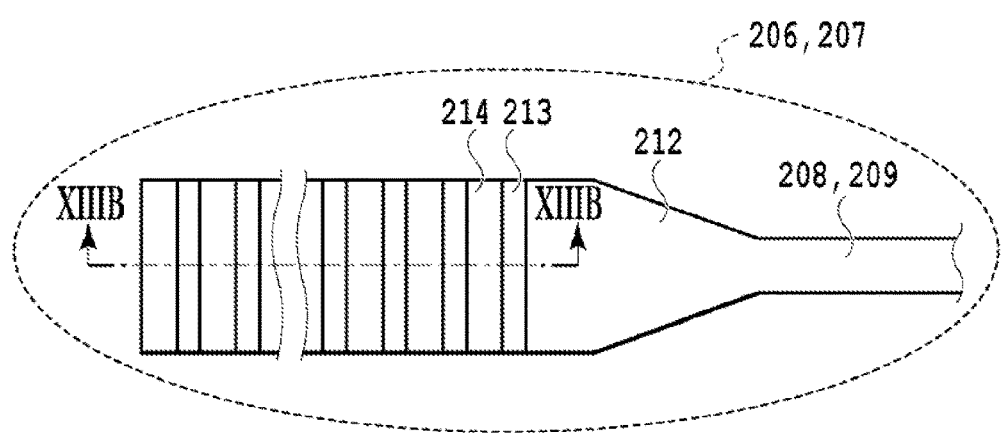
FIG. 13A is an enlarged top view illustrating the grating coupler of FIG. 12.

FIG. 13A is a top view illustrating the configuration example of the grating coupler 206 or 207 that is the monitor light input mechanism of FIG. 12. FIG. 13A illustrates a taper waveguide 212, a core portion 214 having a thick grating, and a core portion 213 having a thin grating. The taper waveguide 212 provides the waveguide width increased to 10 µm.

Figure 13B:
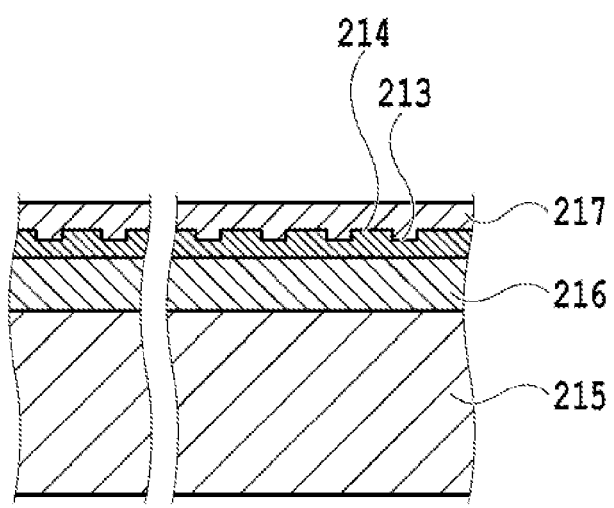
FIG. 13B is a cross-sectional view taken along XIIIB illustrating the grating coupler of FIG. 13A.

FIG. 13B illustrates the circuit structure at the XIIIB cross section of the grating coupler 206 and 207 at the input side of FIG. 13A. In FIG. 13B, the waveguide cores 213 and 214 forming the grating are formed by silicon. A lower clad 216 and an upper clad 217 are both formed by quartz glass and are layered on a silicon substrate 215. The grating has a pitch of 0.7 μm and each waveguide 214 has a length of 0.35 μm. The waveguide 214 has a core thickness of 0.22 μm, the waveguide 213 has a core thickness of 0.15 μm, the upper clad 217 has a thickness of 1.5 μm, and the lower clad 216 has a thickness of 2 μm.

The output-side grating couplers 210 and 211 functioning as the output mechanism of FIG. 12 also has a configuration similar to that shown in FIGS. 13A and 13B except for that the left side and the right side are exchanged.

Figure 14:
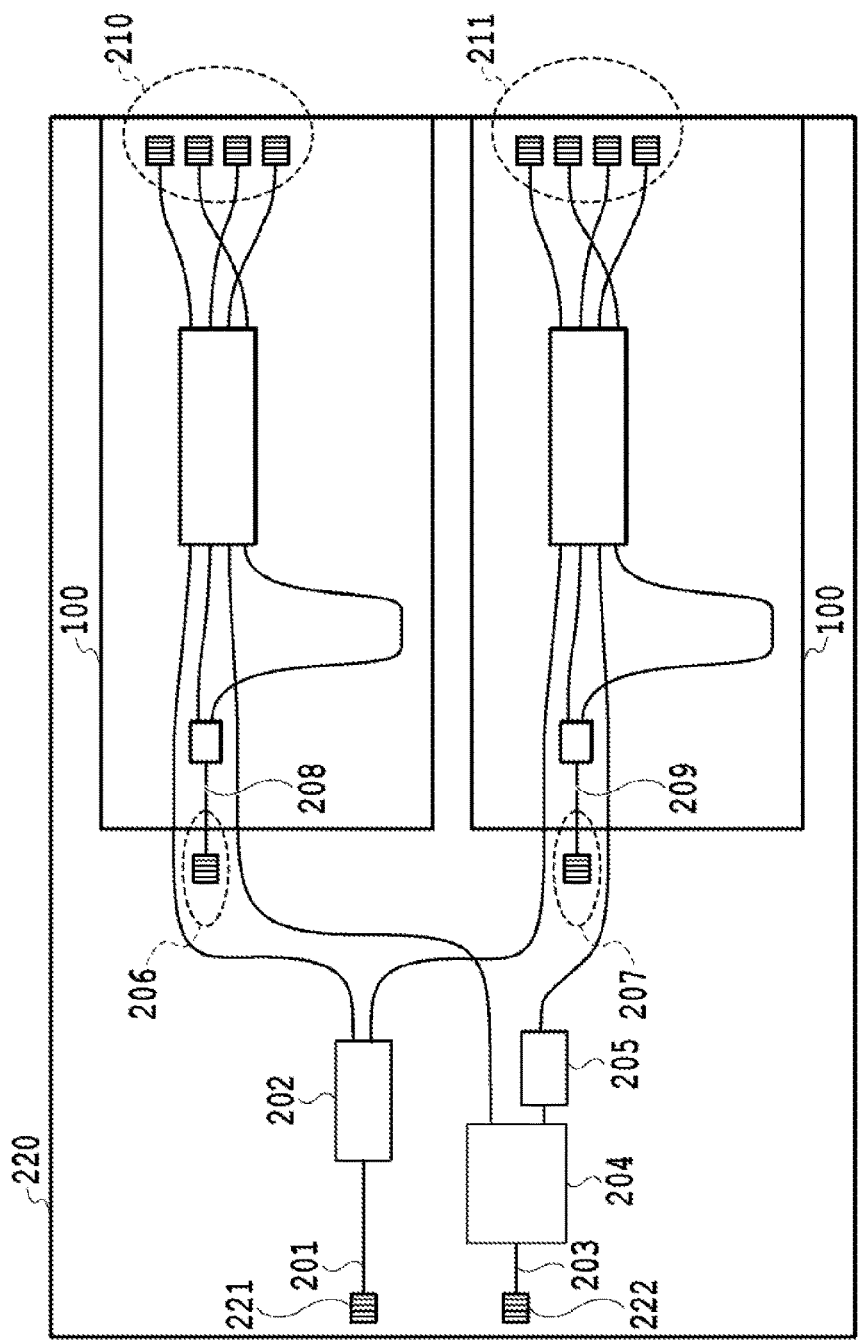
FIG. 14 is a plan view illustrating another configuration of the optical polarization separation/demodulation circuit to which the coherent optical mixer circuit is applied in the second embodiment of the present invention.

FIG. 14 illustrates another configuration example 220 of the optical polarization separation/demodulation circuit of Embodiment 2. Configuration of FIG. 14 is substantially similar to the configuration of FIG. 12 except for that the input waveguides 201 and 203 are also connected to input mechanisms 221 and 222 configured by the grating coupler of FIGS. 13A and 13B. The signal light and the locally-generated light are also inputted from the upper side of the chip. Thus, the only difference therebetween is the light input structure and there is no difference therebetween in the operation of the optical polarization separation/demodulation circuit 220.

Figure 15:
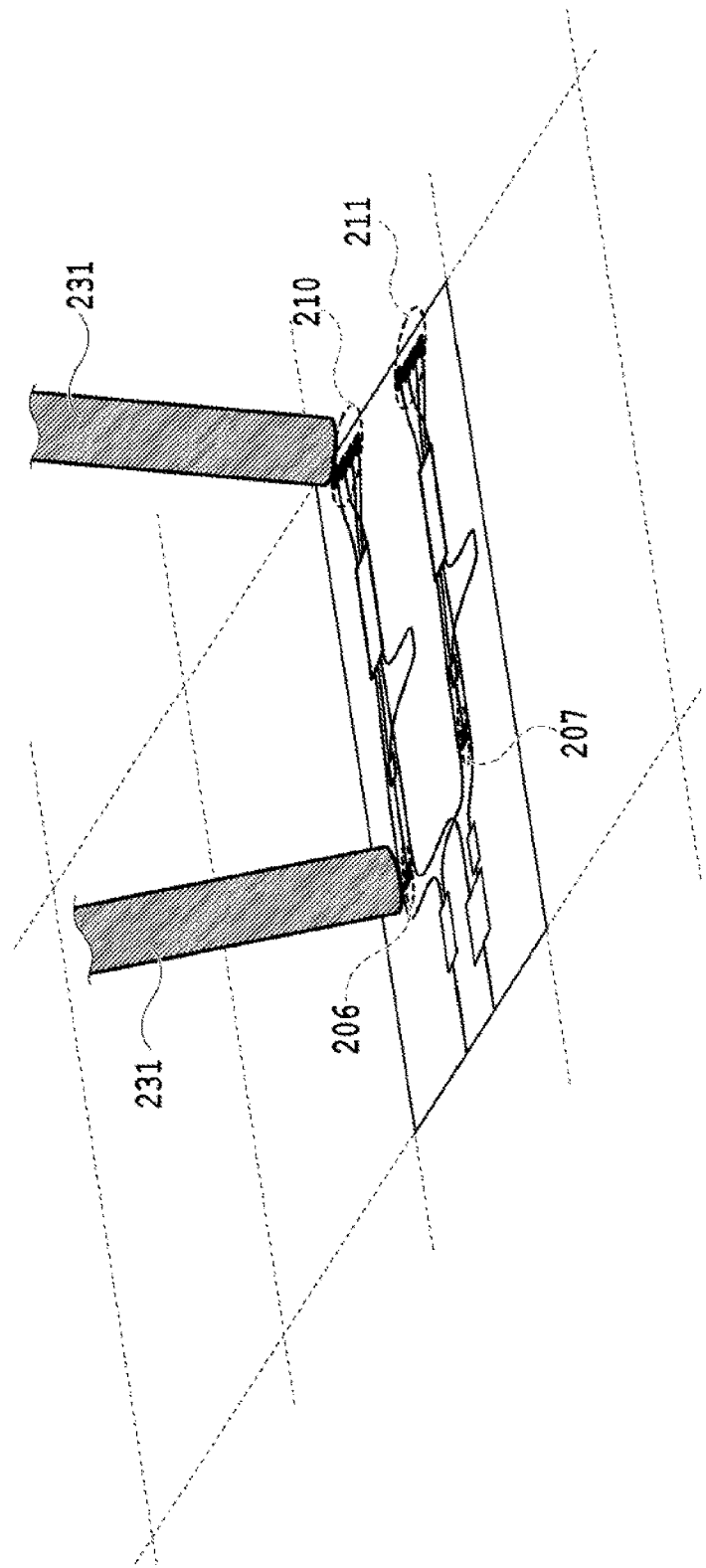
FIG. 15 is a schematic view illustrating the measurement of the characteristic of the coherent optical mixer circuit in a wafer status in the second embodiment of the present invention.

FIG. 15 shows an additional advantage of Embodiment 2 compared to Embodiment 1. Specifically, FIG. 15 is a schematic view illustrating a method of using the grating couplers 206, 207, 210, and 211 functioning as the input mechanism and the output mechanism in the optical polarization separation/demodulation circuit of FIG. 12 or 14 to measure the coherent optical mixer circuit in the wafer status.

The grating couplers 206, 207, 210, and 211 can change the direction of the light toward the upper side of the chip. The light can be inputted or outputted in the changed direction, thus the need of cutting a chip to form an end face for the input or output of light is eliminated. Specifically, light can be inputted to or outputted from the circuit in the wafer status to measure the characteristic of the circuit, which provides a significant advantage to the manufacturing process.

FIG. 15 illustrates the optical polarization separation/demodulation circuits of FIG. 12 or FIG. 14 arranged in a wafer status prior to the chip cutting process. A specific circuit on the wafer is optically coupled to optical fibers 231 provided in the vicinity of the upper side of the grating couplers.

The input-side optical fiber is connected to a measurement monitor light source, and output-side fiber is connected to a detector, thereby evaluation of the circuit characteristic in the wafer status as in the case of the conventional chip is provided.

Figure 16A:
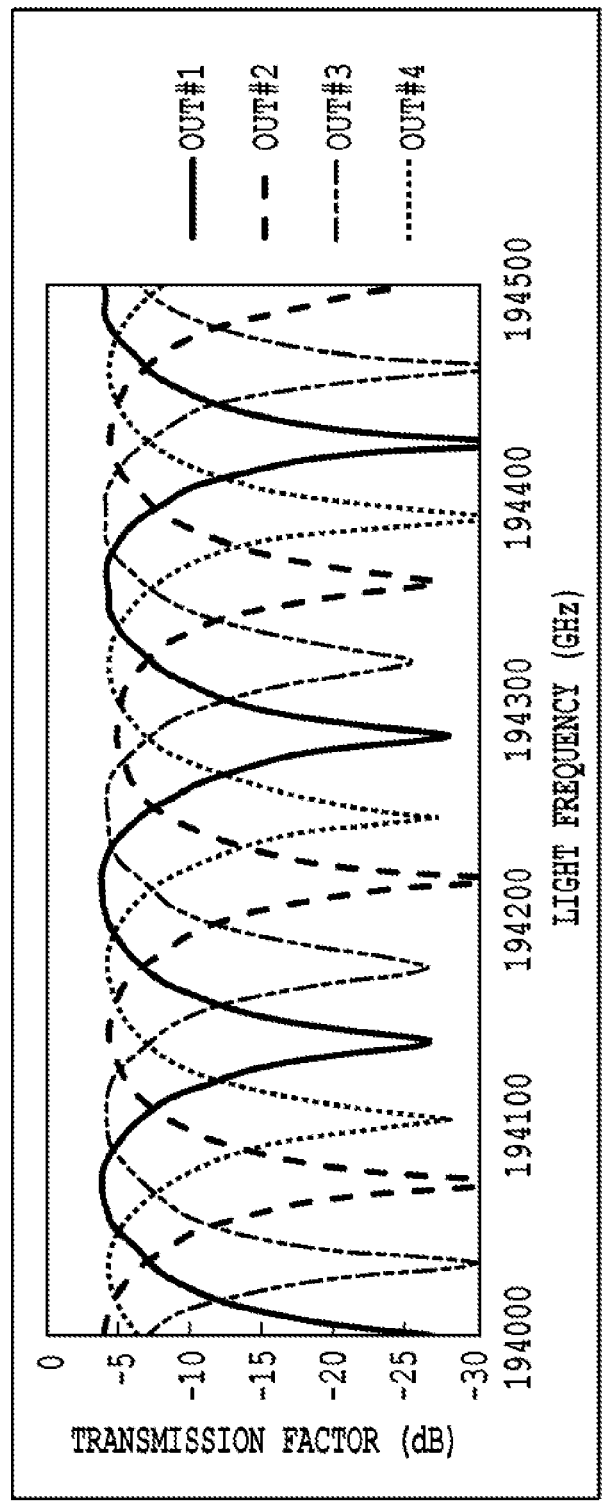
FIG. 16A illustrates the monitor light transmission spectra from the input mechanism to the respective output mechanisms in the second embodiment of the present invention.
Figure 16B:
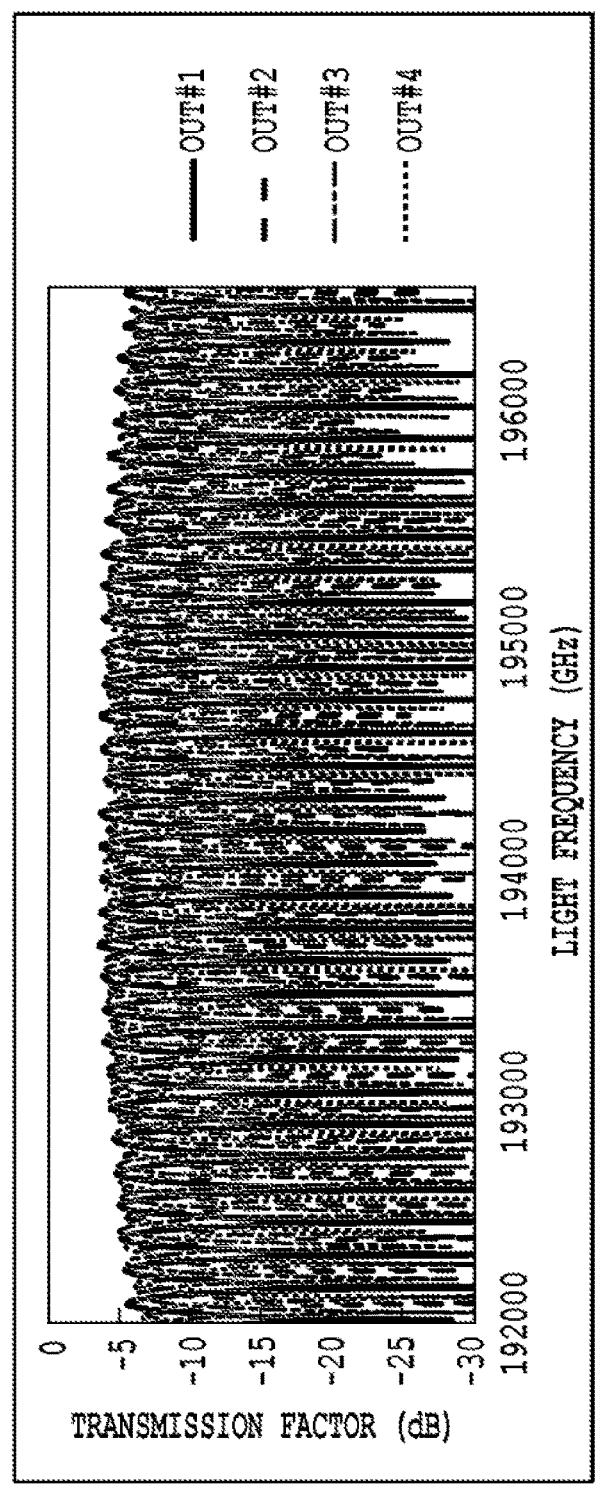
FIG. 16B illustrates the monitor light transmission spectra from the input mechanism to the respective output mechanisms in the second embodiment of the present invention.

FIGS. 16A and 16B illustrate the transmission spectra of light outputted through the respective four grating couplers of the output mechanism 210 or 211. The monitor light is inputted through the monitor light input mechanism 206 or 207 configured by a grating coupler in the optical polarization separation/demodulation circuit of Embodiment 2 of the present invention shown in FIG. 12 or FIG. 14. FIG. 16A illustrates the spectra in the vicinity of the light frequency of 194100 GHz (about wavelength 1545 nm). FIG. 16B illustrates the same spectra of substantially the entire C band wavelength region having a wider range. Here, the spectra OUT #1, OUT #2, OUT #3, and OUT #4 illustrate the four output light transmission spectra of the grating coupler 210 or 211, respectively in an order from the upper side. The grating coupler has wavelength dependency on the coupling efficiency to the optical fibers. The grating coupler of FIGS. 13A and 13B is designed so that the maximum coupling efficiency is achieved in the vicinity of the wavelength of 1545 nm. The transmission spectra also reflect the coupling efficiency of the grating coupler. However, this influence can be deducted in the analysis. Thus, the phase error characteristic can be evaluated as in the related art and Embodiment 1.

As described above, according to the light demodulation circuit of Embodiment 2, as in Embodiment 1, without requiring the delay circuit in the input unit of the signal light and the locally-generated light, monitor light can be inputted from another input mechanism 206 and 207 to thereby evaluate the phase error characteristics of the two coherent optical mixer circuits. The input mechanism 206, 207 and the light splitter and the delay circuit at the subsequent stage thereof do not have any influence on the actual operation of the light demodulation circuit. Therefore they do not have to be removed. Thus, this embodiment can realize a light demodulation circuit that can provide the evaluation of the phase error characteristic and that does not require a step of cutting away the delay circuit.

Furthermore, the grating couplers 206, 207, 210, and 211 can change the direction of the light to the upper side of the chip so that the light can be inputted and outputted in the changed direction. Thus a chip end face do not have to be provided. This consequently provide the evaluation of the phase error characteristic of a chip in the wafer status prior to the chip cutting process and the selection of a circuit in advance. Embodiment 2 thus can realize significant reduction of the inspection step after the chip cutting process when compared with Embodiment 1.

In addition, the monitor waveguides 208 and 209 can have a layout reaching the input mechanisms 206 and 207 without requiring the waveguide intersection. The deletion of waveguide intersection can provide the reduction of the insertion loss in the light demodulation circuit when compared with Embodiment 1.

Third Embodiment

The following section will describe the light demodulation circuit according to the third embodiment of the present invention.

Figure 17:
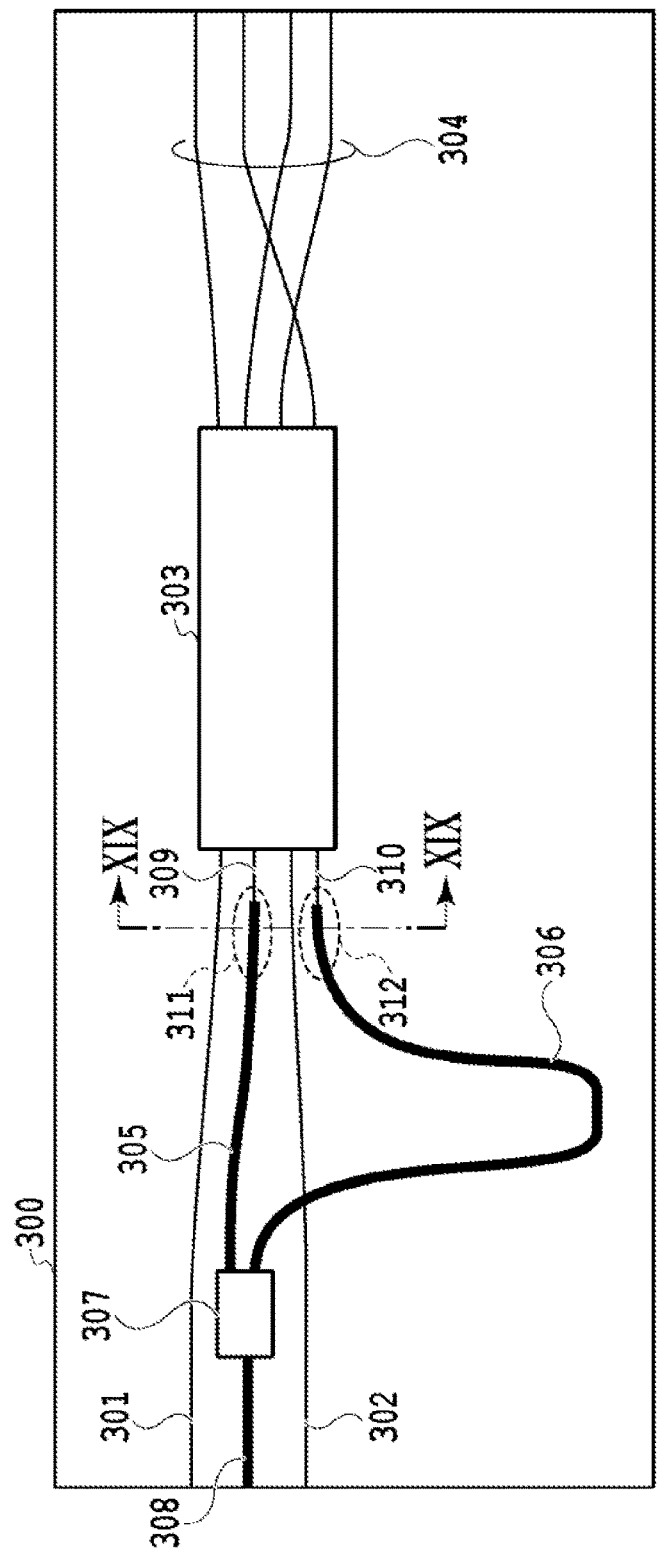
FIG. 17 is a plan view illustrating the configuration of the coherent optical mixer circuit in the third embodiment of the present invention.

FIG. 17 is a plan view illustrating the configuration of a coherent optical mixer circuit 300 that is a light demodulation circuit in Embodiment 3. FIG. 17 illustrates the input waveguides 301 and 302, a 4-input-and-4-output design MMI circuit 303, and a 4-port output waveguide 304 including a waveguide intersection. The configuration of Embodiment 3 described up to here is similar to that of Embodiment 1 (in FIG. 6) and is formed by a silicon waveguide. The respective waveguides 301, 302, and 304 are designed to have a waveguide core width of 0.5 μm and the MMI circuit 303 has a core width of 6 μm and a length of 55 μm.

In Embodiment 3, delay circuits 305, 306 and a monitor input waveguide 308 for the phase error evaluation are shown by the thick line in FIG. 17 and are connected by a light splitter 307. Embodiment 3 is characterized that they are formed in a layer that is different from a layer including a silicon waveguide. These waveguides are connected by interlayer connections 311 and 312.

The waveguides formed in a layer different from that of this silicon waveguide are preferably made of a material having a refractive index between those of silicon and quartz. Specifically, impurity doped quartz, SiOx, SiON, or $Si_3N_4$ for example can be used. This embodiment uses $Si_3N_4$ as such material. In this case, the interlayer connections 311 and 312 connect the $Si_3N_4$ waveguides and the silicon waveguides. The silicon waveguides 309 and 310 are connected to the MMI circuit 303.

Figure 18:
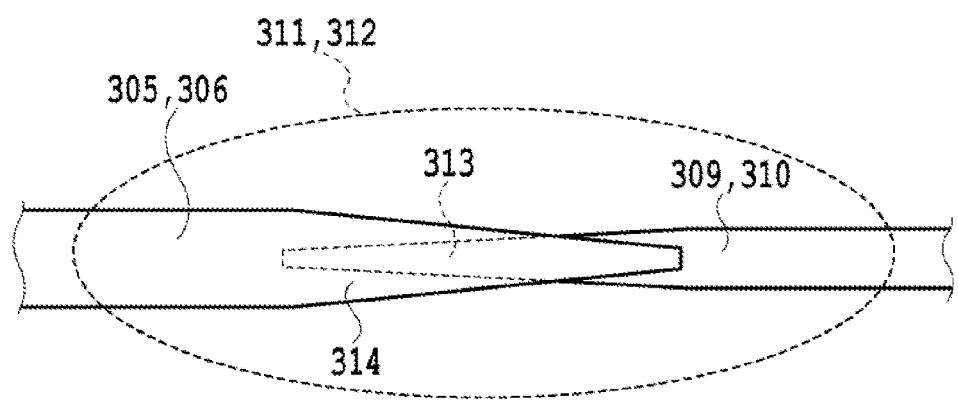
FIG. 18 is a plan view illustrating the details of the interlayer connection of FIG. 17.

FIG. 18 is a plan view illustrating the details of the interlayer connections 311 and 312 of FIG. 17. $Si_3N_4$ waveguides 305 and 306 are designed to have a waveguide core width of 1.0 μm. The interlayer connections have an inverse tapered structure 314 having an end edge of a reduced width 0.3 μm. Silicon waveguides 309 and 310 connected thereto have a tapered waveguide 313 provided to be superposed with the inverse tapered structure 314. The tapered waveguide 313 has a top end core width of 0.15 μm and the core width is increased to 0.5 μm to provide the connection to the silicon waveguides 309 and 310. The silicon waveguides 309 and 310 are designed to have a waveguide core width of 0.5 μm.

Figure 19:
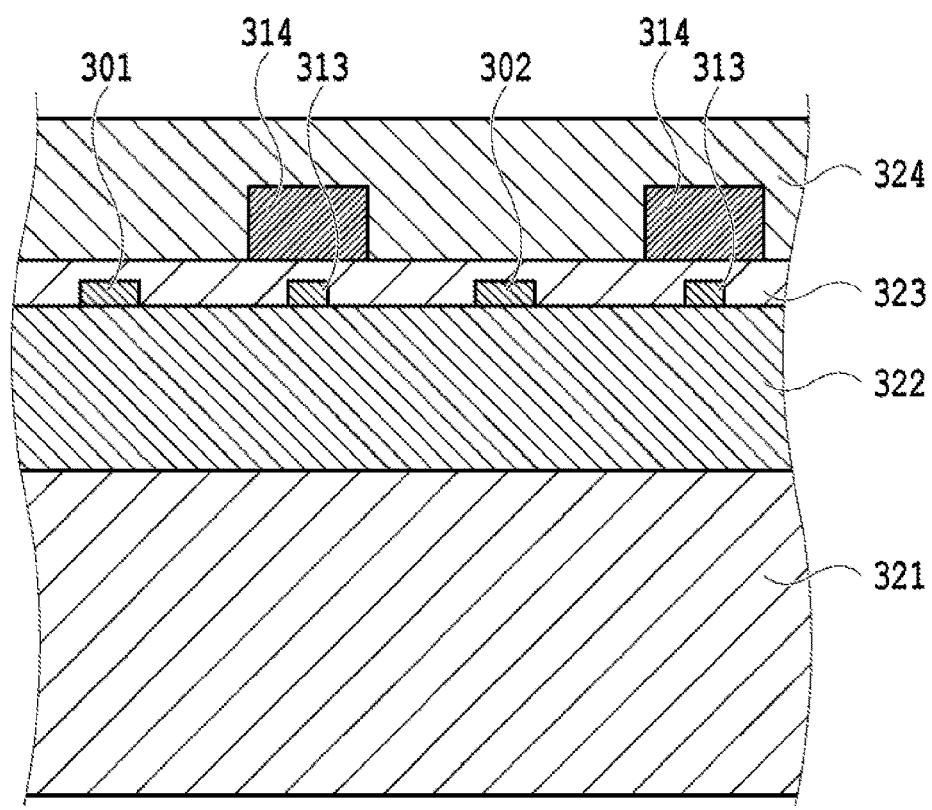
FIG. 19 is a cross-sectional view taken along XIX of the interlayer connection of FIG. 17.

FIG. 19 illustrates the circuit structure at the XIX cross section in FIG. 17, i.e., a cross-sectional view vertical to the waveguides of the interlayer connections 311 and 312. In FIG. 19, the $Si_3N_4$ waveguide has a core thickness of 0.4 μm in the middle of the inverse tapered structure 314. FIG. 19 also illustrates the silicon input waveguides 301 and 302 and a cross section corresponding to that of the middle of the taper structures 313 of the silicon waveguides. A lower clad 322, an intermediate clad 323, and an upper clad 324 are all formed by quartz glass and are layered on a silicon substrate 321. The silicon waveguides 301, 302, and 313 have a core thickness of 0.22 μm. The lower clad 322 has a thickness of 2 μm. The intermediate clad 323 has a thickness of 0.32 μm. Specifically, the gap distance between the core upper face of the silicon waveguide 313 and the core lower face of the $Si_3N_4$ waveguide 314 is 0.1 μm. In the interlayer connections 311 and 312, the light signal propagated through the $Si_3N_4$ waveguide 314 is transmitted to the silicon waveguide 313 via this gap. The upper clad 324 has a thickness of 2 μm.

Figure 20:
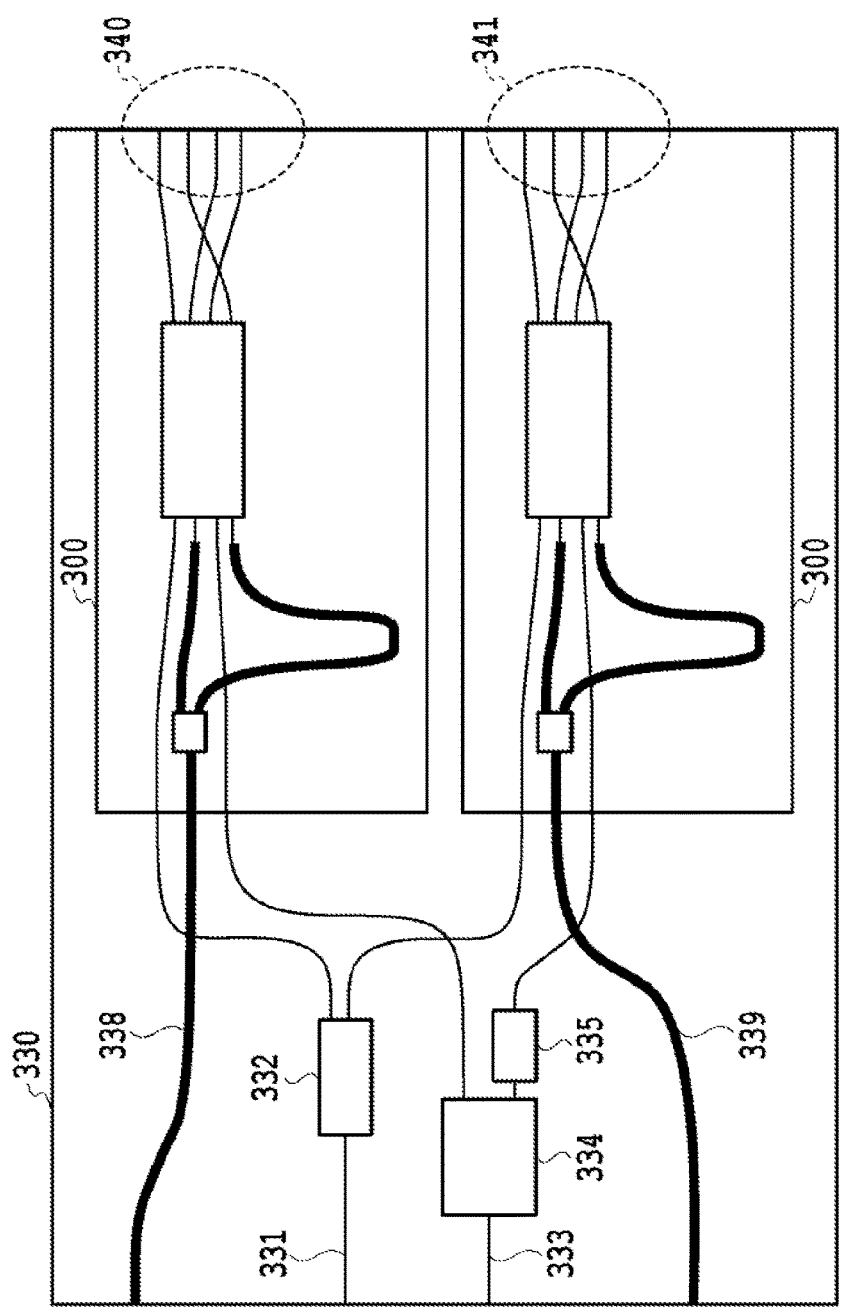
FIG. 20 is a plan view illustrating the configuration of the optical polarization separation/demodulation circuit to which the coherent optical mixer circuit is applied in the third embodiment of the present invention.

FIG. 20 is a plan view illustrating the configuration of an optical polarization separation/demodulation circuit 330 to which two coherent optical mixer circuit 300 of Embodiment 3 is applied. The coherent optical mixer circuit 300 has a configuration as shown in FIG. 17. As in Embodiments 1 and 2, Embodiment 3 of FIG. 20 also includes the input waveguides 331 and 333, a 2-branched light splitter 332, a polarization beam splitter 334, and a polarization rotation circuit 335. In the polarization diversity configuration using the two coherent optical mixers 300, the light signal inputted from the transmission path to the input waveguide 333 is separated by the polarization beam splitter 334 to TE and TM polarized light components. The separated TM polarized light component of the signal light is converted to a TE polarized light component in the polarization rotation circuit 335, resulting in the separation to the TE and TM polarized light components of the signal light. Both of the TE and TM polarized light components are inputted as two TE polarized lights to the two coherent optical mixers 300, respectively. On the other hand, the locally-generated light inputted from the locally-generated light source to the input waveguide 331 is of TE polarized light. The TE polarized local light is distributed to two lights by the light splitter 332 and the two lights are inputted to the two coherent optical mixers 300, respectively.

The respective four outputs ports of the two coherent optical mixers 300 have a structure to use the output mechanisms 340 and 341 to output light from the chip end face to the exterior. The output light is received by an externally-provided photo detector. The monitor input waveguide formed in the $Si_3N_4$ layer in the two coherent optical mixers 300 reaches the chip end face via the monitor waveguides 338 and 339 of $Si_3N_4$ waveguide, respectively.

The $Si_3N_4$ waveguide has a relatively-large mode field diameter compared to the silicon waveguide and can be efficiently coupled with optical fibers at the chip end face. The monitor waveguides 338 and 339 configured by the $Si_3N_4$ waveguide formed in a layer different from that of the silicon waveguide can provide the intersection with other silicon waveguides for propagating the signal light and the locally-generated light without causing a loss.

As described above, the light demodulation circuit of Embodiment 3, as in Embodiment 1 and Embodiment 2, does not require a delay circuit in the input unit of the signal light and the locally-generated light. And allows the monitor light to be inputted through another monitor input waveguide 338 or 339 to thereby evaluate the phase error characteristics of the two coherent optical mixer circuits. This monitor input waveguide 338 or 339 and the light splitter 307 and the delay circuits 305 and 306 at the subsequent stage thereof do not have any influence on the actual operation of the light demodulation circuit and thus do not have to be removed. Thus, Embodiment 3 also can realize a coherent optical mixer circuit that allows the evaluation of the phase error characteristic and that eliminates the need for a step of cutting away a delay circuit.

In addition, according to Embodiment 3, the monitor input waveguide 338 or 339 can provide a higher coupling efficiency to the optical fibers when compared with Embodiment 1 and Embodiment 2, thus enable evaluating the phase error at a relatively-high accuracy.

Furthermore, the monitor input waveguide 338 or 339 can realize the intersection with the silicon waveguide without causing a loss, thus realizing the light demodulation circuit without causing an increased circuit loss when compared with the conventional case.

Fourth Embodiment

The light demodulation circuit according to the fourth embodiment of the present invention has a main configuration as in Embodiment 3 and is characterized in that a grating coupler is used by both of the input mechanism to the monitor input waveguide to evaluate the phase error and the output mechanism from the output waveguide of the coherent optical mixer circuit.

This consequently provides, as in Embodiment 2, the evaluation of the phase error characteristic of a chip in the wafer status prior to the chip cutting process to select a circuit in advance, thus Embodiment 4 provides significant reduction of the inspection step after the chip cutting process when compared with Embodiment 1 and Embodiment 3.

Figure 21:
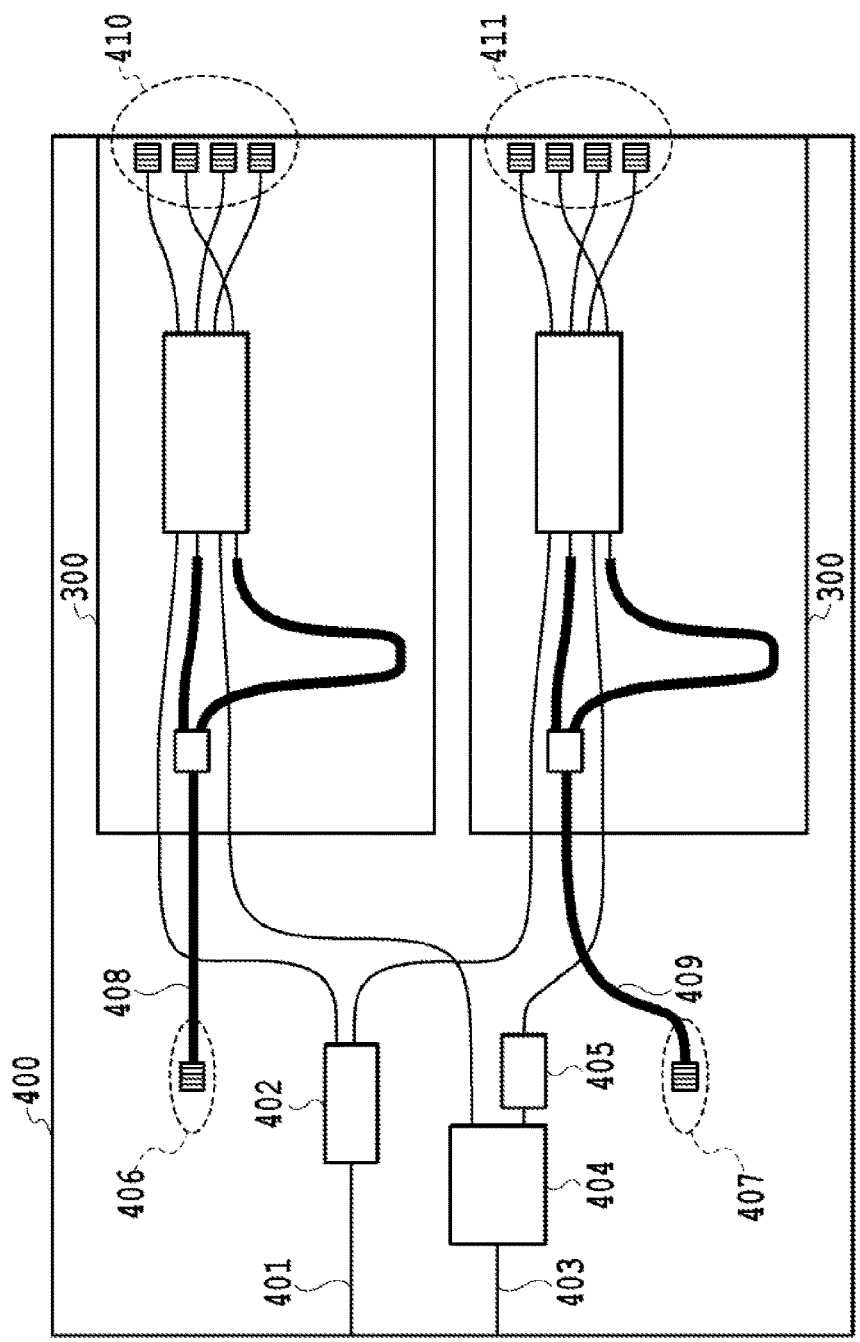
FIG. 21 is a plan view illustrating the configuration of the optical polarization separation/demodulation circuit to which the coherent optical mixer circuit is applied in the fourth embodiment of the present invention.

FIG. 21 is a plan view illustrating the configuration of a light demodulation circuit 400 of Embodiment 4. The coherent optical mixer circuit 300 has a configuration similar to that of FIG. 17 of Embodiment 3. FIG. 21 illustrates input waveguides 401 and 403, a 2-branched light splitter 402, a polarization beam splitter 404, and a polarization rotation circuit 405. As in other embodiments, this embodiment uses the polarization diversity configuration using the two coherent optical mixers 300.

The two coherent optical mixers 300 have the respective four output ports structured so that the grating couplers 410 and 411 functioning as output mechanisms are used to output light substantially in the vertical direction of the chip substrate face (in the backward direction of the view). The output lights are received by the photo detectors (not shown)

provided at the upper side of the chip substrate face. The output-side grating couplers 410 and 411 are formed by silicon waveguides and have a detailed structure as shown in FIGS. 13A and 13B of Embodiment 2.

On the other hand, the input side of the two coherent optical mixers 300 have additional input waveguides formed in the $Si_3N_4$ layer. The monitor waveguides 408 and 409 of $Si_3N_4$ waveguides are connected to the grating couplers 406 and 407 functioning as input mechanisms, and are coupled to the light input (e.g., optical fibers) provided at the upper side of the exterior, respectively. The grating couplers 406 and 407 are formed by an $Si_3N_4$ waveguide.

Figure 22A:
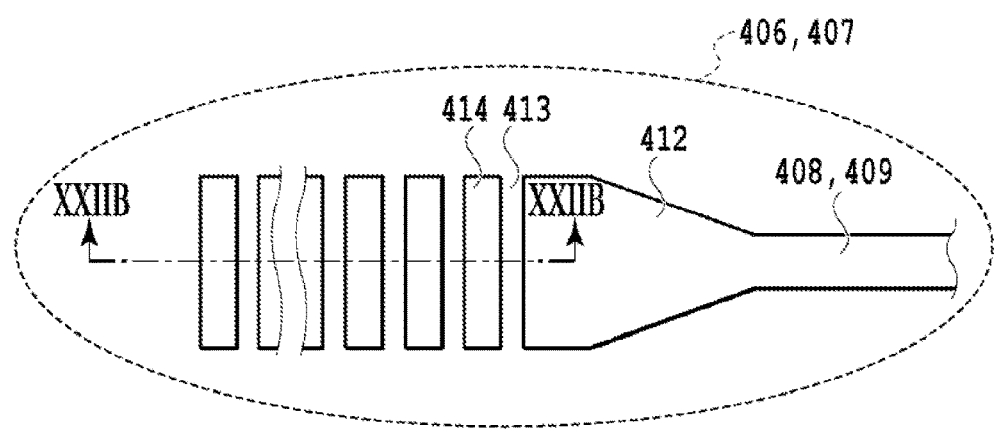
FIG. 22A is a plan view illustrating the details of the grating coupler of FIG. 21.

FIG. 22A is a plan view illustrating the details of the input-side grating couplers 406 and 407 of FIG. 21 formed by the $Si_3N_4$ waveguide as described above. FIG. 22A illustrates a taper waveguide 412, a grating core portion 414, and a grating gap portion 413.

Figure 22B:
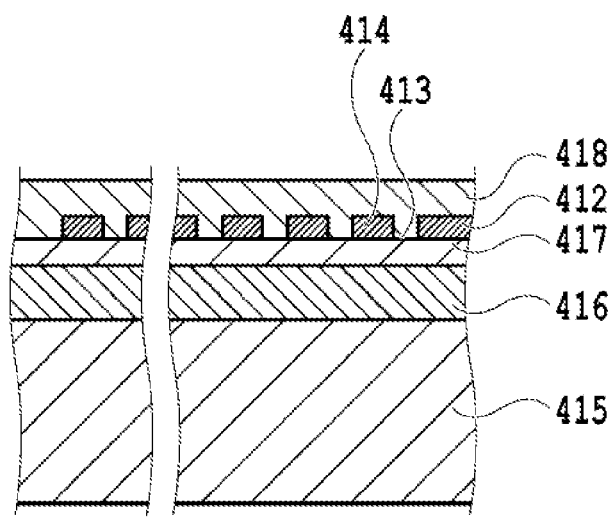
FIG. 22B is a cross-sectional view taken along XXIIB illustrating the grating coupler of FIG. 22A.

FIG. 22B illustrates the circuit structure at the XXIIB cross section of the grating couplers 406 and 407 of FIG. 22A. In FIG. 22B, the waveguide core portion 414 forming a grating is formed by $Si_3N_4$. A lower clad 416, an intermediate clad 417, and an upper clad 418 are all formed by quartz glass and are layered on a silicon substrate 415.

The $Si_3N_4$ waveguide 414 has a core thickness of 0.4 μm, a grating pitch of 1.05 μm, and each gap 413 of 0.5 μm. The upper clad 418 has a thickness of 1.5 μm. The intermediate clad 417 has a thickness of 0.32 μm. The lower clad 416 has a thickness of 2 μm.

On the other hand, output-side grating couplers 410 and 411 of FIG. 21 are formed by a silicon waveguide and have a configuration similar to that shown in FIGS. 13A and 13B except for that the left side and the right side are switched.

Fifth Embodiment

The following section will describe the optical reception circuit according to the fifth embodiment of the present invention.

Figure 23:
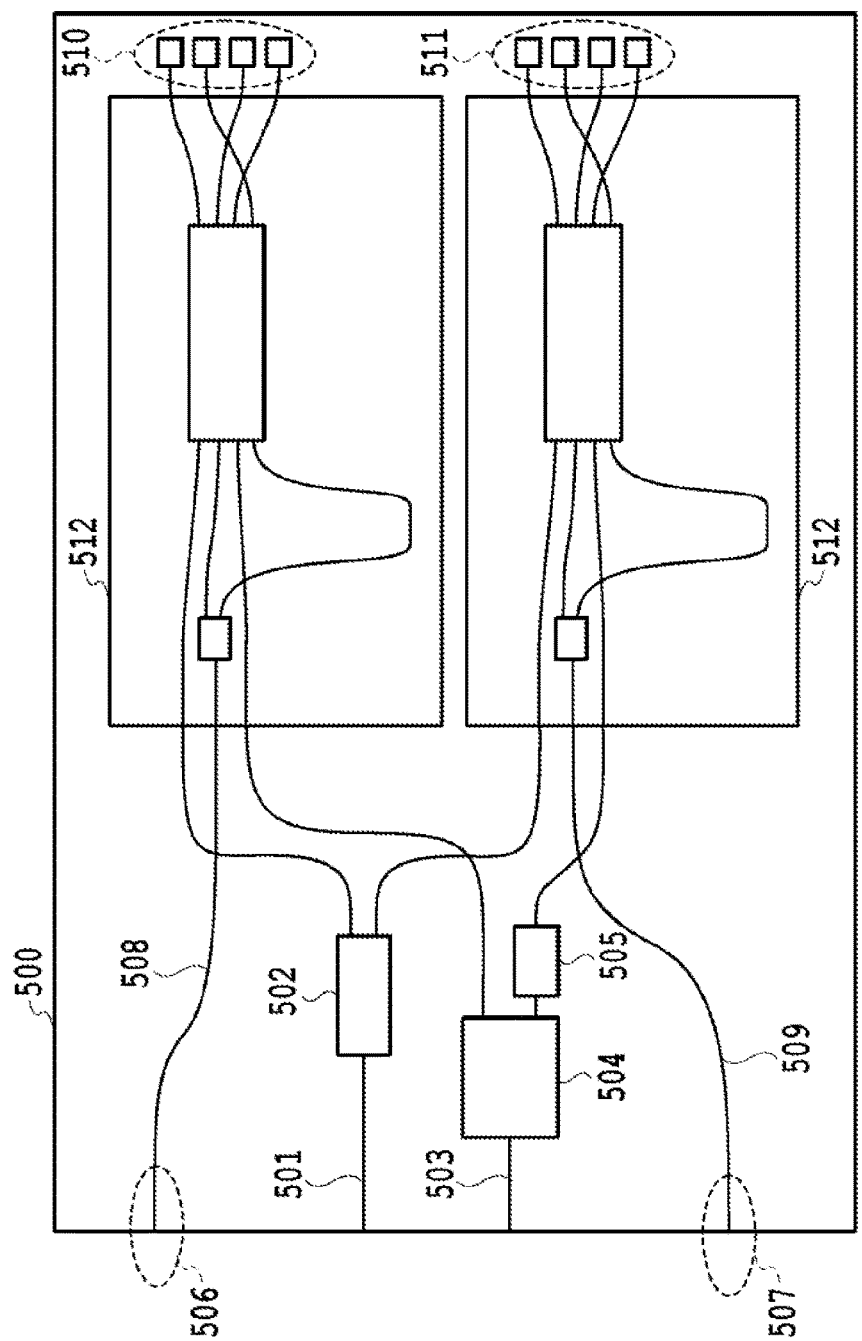
FIG. 23 is a plan view illustrating the configuration of the optical reception circuit to which the coherent optical mixer circuit is applied in the fifth embodiment of the present invention.

FIG. 23 is a plan view illustrating the configuration of an optical reception circuit 500 of Embodiment 5. The reception circuit of Embodiment 5 is characterized in including, in addition to the optical polarization separation/demodulation circuit as in Embodiment 1, photo detectors 510 and 511 integrated on the same chip.

FIG. 23 illustrates input waveguides 501 and 503, a 2-branched light splitter 502, a polarization beam splitter 504, and a polarization rotation circuit 505. These configuration and function are similar to those of Embodiment 1. Two coherent optical mixers 512 are as shown in FIG. 6 of Embodiment 1. The two coherent optical mixers 512 also have an additional input waveguide that reach, as in Embodiment 1, the chip end face at input mechanisms 506 and 507 via monitor waveguides 508 and 509 including waveguide intersection, respectively.

The input mechanisms 506 and 507 have a configuration as shown in FIG. 9 of Embodiment 1 in which the inverse tapered waveguide 142 having a tapered tip end is provided at the chip end and the chip end face has an increased light mode diameter to realize the coupling with optical fibers for example at a relatively-high efficiency. The tip end of the inverse tapered waveguide 142 has a waveguide core width of 0.15 μm.

In contrast with Embodiment 1, the two coherent optical mixers 512 have the respective four output ports that are connected to the photo detectors 510 and 511 integrated on the same chip. The photo detector respectively converts output light to an electric signal and output the resultant electric signal. The photo detectors are a so-called waveguide-type germanium photo detector that can be integrated with a silicon waveguide.

Figure 24A:
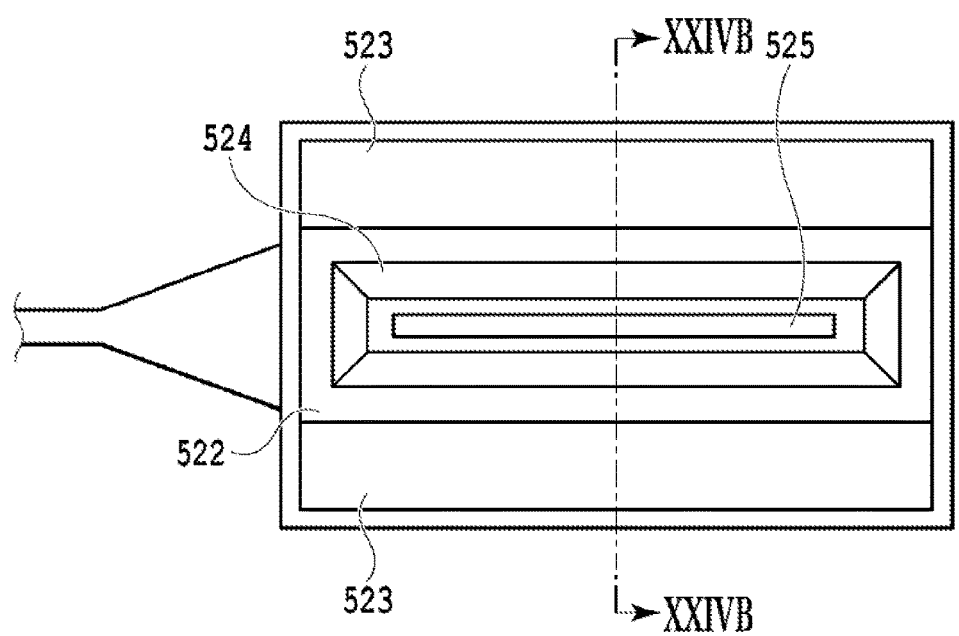
FIG. 24A is a plan view illustrating the details of the general germanium photo detector.
Figure 24B:
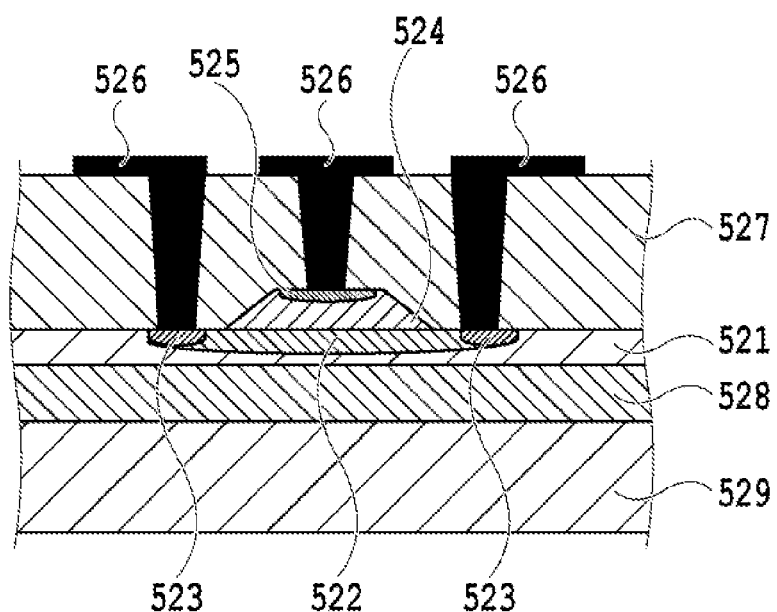
FIG. 24B is a cross-sectional view taken along XXIVB of the germanium photo detector of FIG. 24A.

FIG. 24A is a plan view illustrating the details of a general waveguide-type germanium photo detector. FIG. 24B illustrates the cross section structure taken along the line segment XXIVB in FIG. 24A. FIG. 24B illustrates a silicon waveguide 521, a p implant region 522 of the silicon waveguide, a p++ implant region 523 of the silicon waveguide, Ge crystal 524 grown on the silicon waveguide, an n implant region 525 of the Ge crystal, an electrode 526, an upper clad 527 formed by quartz, a lower clad 528 similarly formed by quartz, and a silicon substrate 529.

Embodiments subsequent to this embodiment also use a germanium photo detector having a general structure. However, according to a design example, a lower clad 538 has a thickness of 2 μm, a silicon waveguide 521 has a core thickness of 0.22 μm, a Ge crystal 524 has a thickness 0.4 μm, and the Ge crystal 524 has a length of 50 μm along the light propagating direction and a width of 10 μm.

Figure 25:
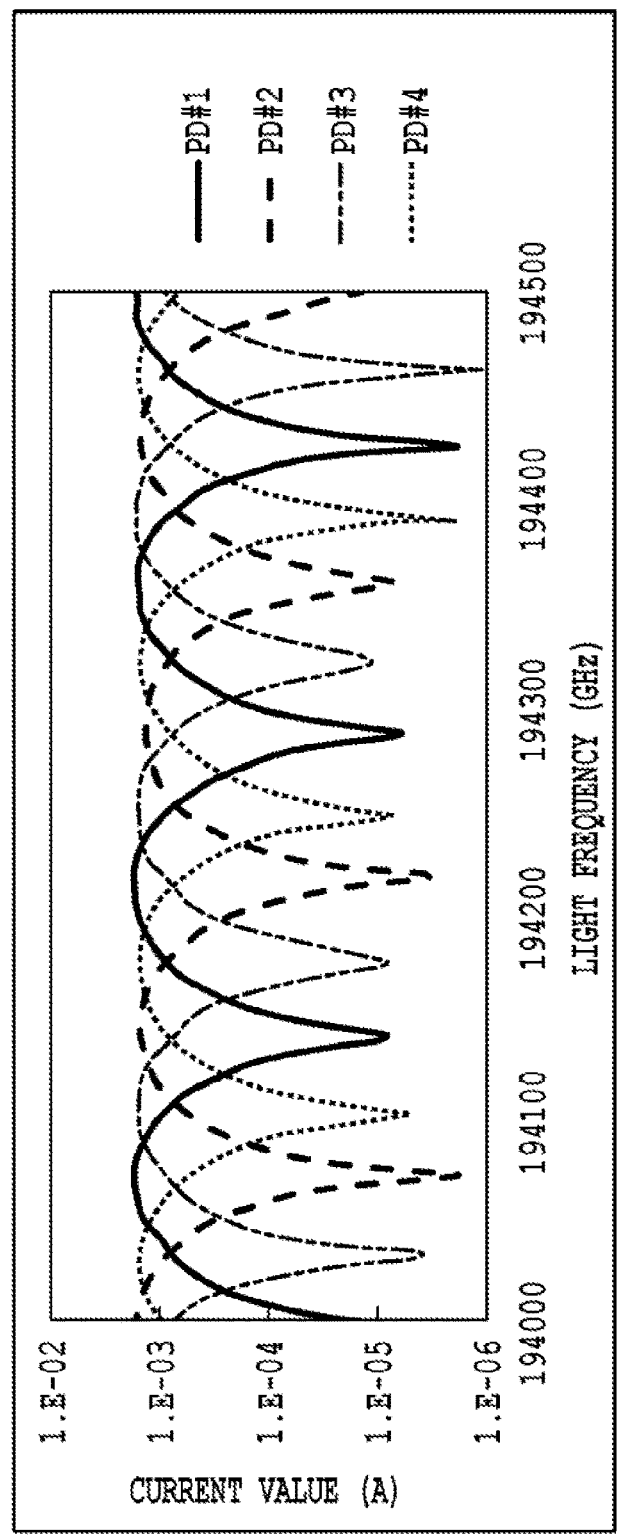
FIG. 25 illustrates the spectra of the current values outputted from the respective photo detectors when light is inputted from the input mechanism in FIG. 23.

FIG. 25 illustrates the input light wavelength dependence (light frequency spectra) of the electric current value outputted from each photo detector 510 or 511 obtained by allowing monitor light to be inputted in the optical reception circuit of FIG. 23 through the input mechanism 506 or 507. The waveforms PD #1, PD #2, PD #3, and PD #4 show the current values corresponding to the photo detector 510 or 511 in an order from the upper side, respectively. This allows light to be inputted through the input mechanism 506 or 507 separate from the input of the signal light and the locally-generated light to thereby provide the analysis of the interference condition in the four outputs as in the related art. This can consequently realize the phase error characteristic evaluation of the coherent optical mixer circuit.

Specifically, the optical reception circuit of this embodiment allows, without requiring a delay circuit as in the related art at the input unit of the signal light and the locally-generated light, another input mechanism 506 or 507 to input light, thereby achieving the evaluation of the phase error characteristics of the two coherent optical mixer circuits. This input mechanism 506 or 507 and the light splitter and the delay circuit at the subsequent stage thereof do not have any influence on the actual operation of the optical reception circuit and thus do not have to be removed.

As described above, this embodiment can realize an optical reception circuit that can evaluate the phase error characteristic and that can eliminate the need for a step of cutting away a delay circuit. In addition, this embodiment allows both of the photo detector and the optical polarization separation/demodulation circuit to be integrated on the same chip. Thus, this embodiment can configure an optical reception circuit without requiring a photo detector at the exterior of the chip as in Embodiment 1, and can realize an optical reception circuit in a simple manufacturing step and low-cost.

Sixth Embodiment

The following section will describe a light demodulation circuit according to the sixth embodiment of the present invention.

Figure 26:
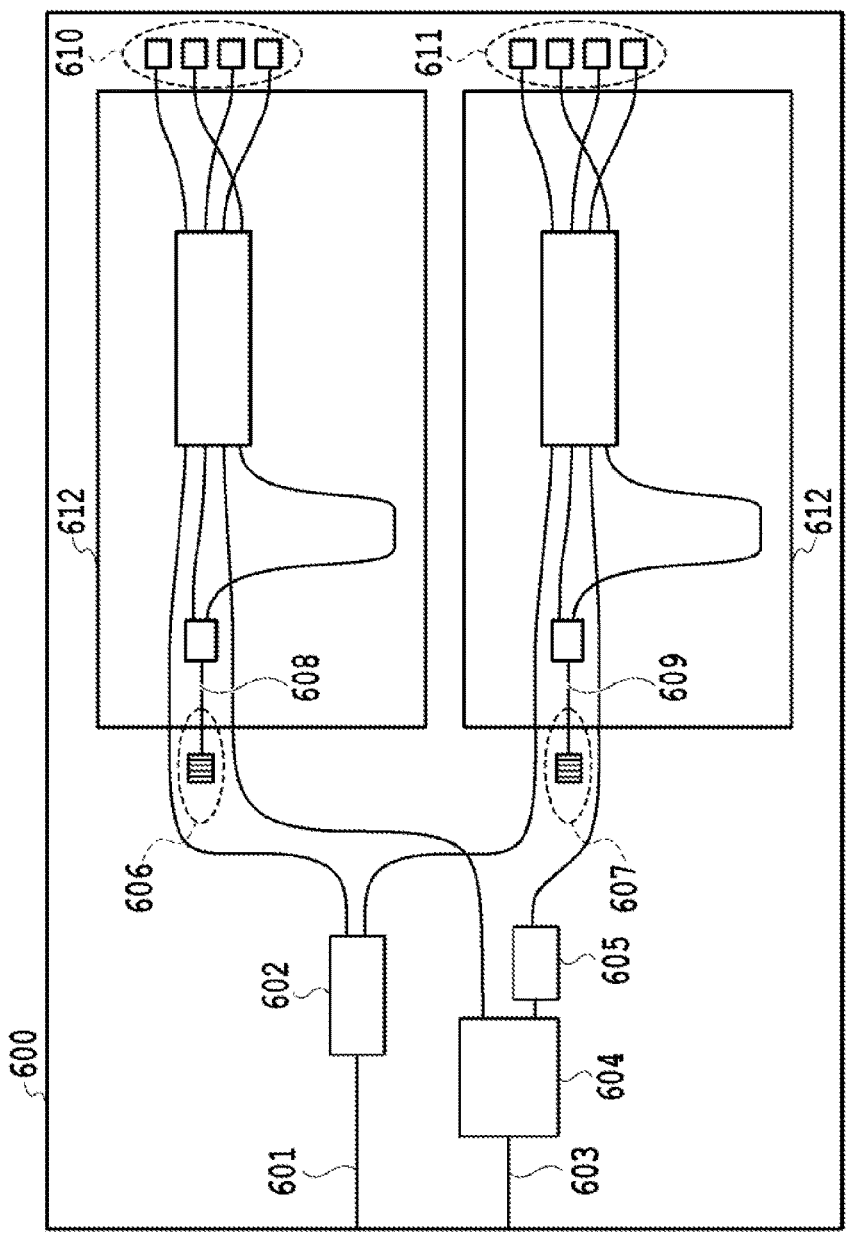
FIG. 26 is a plan view illustrating the configuration of the optical reception circuit to which the coherent optical mixer circuit is applied in the sixth embodiment of the present invention.

FIG. 26 is a plan view illustrating the configuration of an optical reception circuit 600 of Embodiment 6. In Embodiment 6, a coherent optical mixer circuit and an optical reception circuit configured by the coherent optical mixer circuit have the main configuration as that of Embodiment 5. Embodiment 6 is different from Embodiment 5 in the configuration of the input mechanism to input the monitor waveguide for the phase error evaluation.

FIG. 26 illustrates input waveguides 601 and 603, a 2-branched light splitter 602, a polarization beam splitter 604, and a polarization rotation circuit 605 whose configurations and functions are the same as those of Embodiment 5. Two coherent optical mixers 612 are also the same as those of Embodiment 5, i.e., are as shown in FIG. 6 of Embodiment 1.

The two coherent optical mixers 612 have additional input waveguides that reach grating couplers 606 and 607 functioning as an input mechanism via monitor waveguides 608 and 609. The two coherent optical mixers 612 have the respective four output ports connected to photo detectors 610 and 611 integrated on the same chip, respectively, and receive output light. The photo detector is a germanium photo detector that can be integrated with a silicon waveguide.

The grating couplers 606 and 607 can change the light direction to the upper side of the chip so that the light can be inputted and outputted in the changed direction and thus it is not required to provide a chip end face for light input and output. This allows, as shown in FIG. 26, the monitor waveguides 608 and 609 to have a design reaching the grating couplers 606 and 607 without having an intersection with other waveguides. In addition, light can be inputted to the circuit in the wafer status prior to a chip cutting process. On the other hand, even in the photo detectors 610 and 611 integrated on the chip, a probe can contact with an electrode in the wafer status to thereby measure an outputted current value. Thus, the phase error characteristic of each circuit can be measured in the wafer status.

As described above, Embodiment 6 can realize, as in Embodiment 5, an optical reception circuit that can evaluate the phase error characteristic and that can eliminate a step of cutting away a delay circuit. In addition, the photo detector is integrated on the same chip, thus realizing an optical reception circuit in a simple manufacturing step and low-cost.

Furthermore, the phase error characteristic in each optical reception circuit can be evaluated in the wafer status and the circuit can be selected in advance, thus providing significant reduction of the inspection step after the chip cutting process when compared with Embodiment 5.

Seventh Embodiment

The following section will describe the light demodulation circuit according to the seventh embodiment of the present invention.

Figure 27:
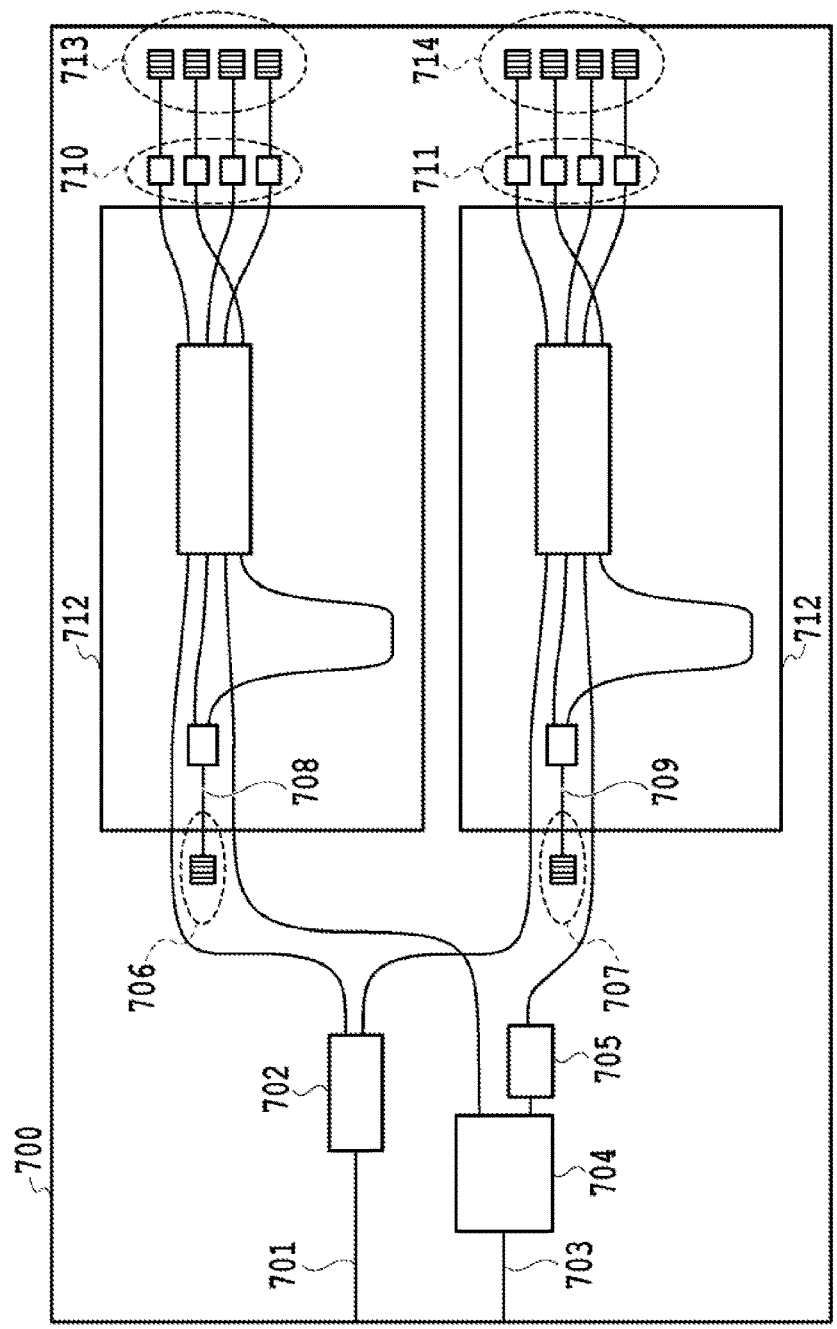
FIG. 27 is a plan view illustrating the configuration of the optical reception circuit to which the coherent optical mixer circuit is applied in the seventh embodiment of the present invention.

FIG. 27 is s plan view illustrating the configuration of an optical reception circuit 700 of Embodiment 7. In Embodiment 7, a coherent optical mixer circuit and an optical reception circuit configured by the coherent optical mixer circuit have the main configuration as that of Embodiment 6. Embodiment 7 is characterized in that the subsequent stages of the respective photo detectors also have waveguides that are connected to the grating coupler functioning as an output mechanism.

FIG. 27 illustrates input waveguides 701 and 703, a 2-branched light splitter 702, a polarization beam splitter 704, and a polarization rotation circuit 705. These configuration and function are the same as those of Embodiment 6. Two coherent optical mixers 712 are also the same as those of Embodiment 6, i.e., are as shown in FIG. 6 of Embodiment 1.

The two coherent optical mixers 712 have additional input waveguides reach grating couplers 706 and 707 functioning as an input mechanism via monitor waveguides 708 and 809. The two coherent optical mixers 712 have the respective four output ports that are connected to photo detectors 710 and 711 integrated on the same chip, respectively, and receive output light. The photo detector is a germanium photo detector that can be integrated with a silicon waveguide whose configuration and function are similar to those of Embodiment 6.

In Embodiment 7, the subsequent stages of the respective photo detectors 710 and 711 are further connected to grating couplers 713 and 714 via a silicon waveguide. In Embodiment 6, in order to evaluate the phase error characteristic of the coherent optical mixer circuit 712, a probe must contact with the electrodes of the photo detectors 710 and 711. During this, since an appropriate bias voltage is applied to the photo detector, a power source for the application thereof is required. An excessive contact of the probe with an electrode may damage the electrode, which may cause the optical reception circuit to be unusable.

On the other hand, in Embodiment 7, the fact is used that the photo detectors 710 and 711 absorb light at a certain ratio to the input. Thus, unabsorbed light is guided to the waveguide and is outputted through the grating couplers 713 and 714. As a result, the input has the grating couplers 706 and 707 coupled with optical fibers and the output has the grating couplers 713 and 714 coupled with optical fibers, thereby providing the evaluation of the phase error characteristic of the coherent optical mixer circuit 712. During this, the photo detectors 710 and 711 are not used and the electrodes thereof do not contact with a probe. Thus, the evaluation can be carried out in a simpler manner and the risk of making an unusable circuit is also excluded.

As described above, Embodiment 7 can realize an optical reception circuit that can, as in Embodiment 6, evaluate the phase error characteristic and that does not require a step of cutting away a delay circuit. In addition, the photo detectors are integrated on the same chip, thus realizing an optical reception circuit in a simple manufacturing step and low-cost. Furthermore, the phase error characteristic of the chip can be evaluated in the wafer status, thus providing significant reduction of the inspection step after the chip cutting process.

Furthermore, the phase error characteristic is evaluated without using a photo detector. Thus, when compared with Embodiment 6, the evaluation can be carried out in a simple manner and the risk of making an unusable circuit due to the evaluation is avoided.

Eighth Embodiment

The following section will describe the light demodulation circuit according to the eighth embodiment of the present invention.

Figure 28:
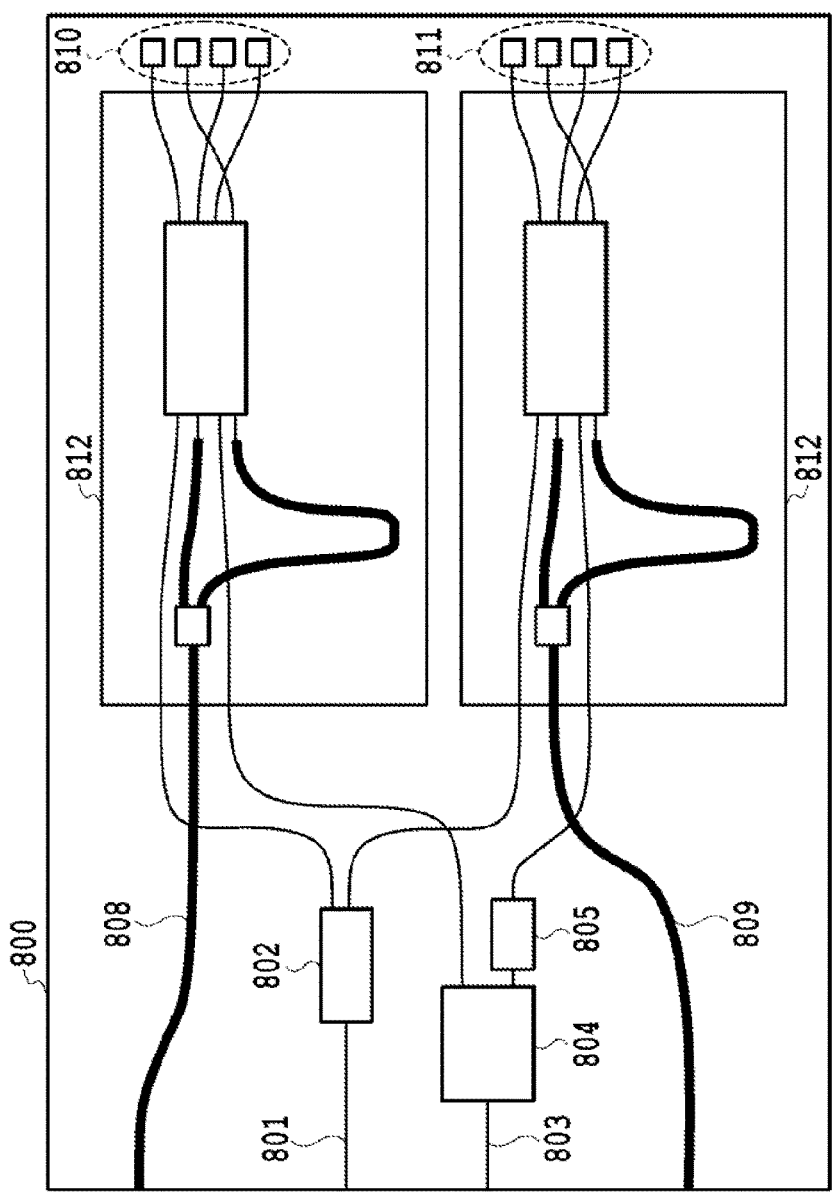
FIG. 28 is a plan view illustrating the configuration of the optical reception circuit to which the coherent optical mixer circuit is applied in the eighth embodiment of the present invention.

FIG. 28 is a plan view illustrating the configuration of an optical reception circuit 800 of Embodiment 8. In Embodiment 8, a coherent optical mixer circuit and an optical reception circuit configured by the coherent optical mixer circuit have the main configuration as that of Embodiment 3 of FIG. 20. Thus, the corresponding components will not be further described. The optical reception circuit of Embodiment 8 is common to Embodiment 3 of FIG. 20 in that two coherent optical mixers 812 have monitor input waveguides formed in $Si_3N_4$ layers that reach the chip end face via monitor waveguides 808 and 809 of $Si_3N_4$ waveguide, respectively.

In Embodiment 8, two coherent optical mixers 812 have the respective four output ports that are connected to photo detectors 810 and 811 integrated on the same chip, respectively to convert the output light to an electric signal and output.

Thus, Embodiment 8 also can realize a light demodulation circuit that can evaluate the phase error characteristic and that does not require a step of cutting away a delay circuit.

In Embodiment 8, the monitor waveguides 808 and 809 configured by an $Si_3N_4$ waveguide have a relatively-high coupling efficiency to optical fibers. Thus, the phase error can be evaluated at a relatively-high accuracy and the intersection with a silicon waveguide can be realized without causing a loss. Thus, a light demodulation circuit can be realized without causing an increased circuit loss when compared with the conventional case.

In addition, in Embodiment 8, the photo detector and the optical polarization separation/demodulation circuit are both integrated on the same chip. Thus, an optical reception circuit can be configured without requiring the provision of the photo detector at the exterior of the chip as in Embodiment 1, thus realizing an optical reception circuit in a simple manufacturing step and low-cost.

Ninth Embodiment

The following section will describe the light demodulation circuit according to the ninth embodiment of the present invention.

Figure 29:
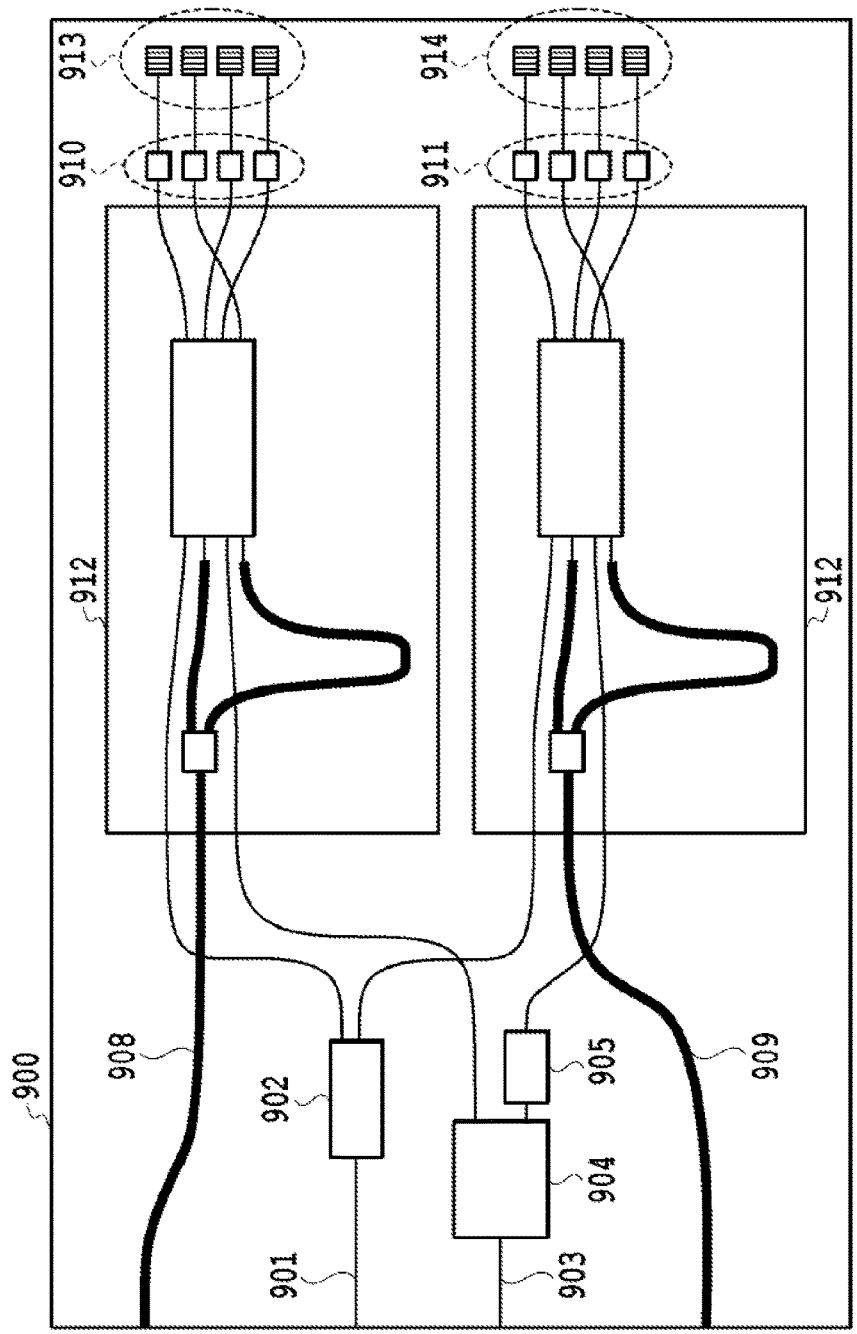
FIG. 29 is a plan view illustrating the configuration of the optical reception circuit to which the coherent optical mixer circuit is applied in the ninth embodiment of the present invention.

FIG. 29 is a plan view illustrating the configuration of an optical reception circuit 900 of Embodiment 9. Embodiment 9 has a main configuration that is the same as that of Embodiment 8 of FIG. 28. Thus, the corresponding components will not be described further. The optical reception circuit of Embodiment 9 has common feature to Embodiment 7 of FIG. 27 in that the subsequent stages of the respective photo detectors 910 and 911 are further connected to grating couplers 913 and 914 via a silicon waveguide.

The fact is used that photo detectors 910 and 911 absorb light at a certain ratio to the input. Thus, unabsorbed light is guided to the waveguide and is outputted through the grating couplers 913 and 914. The grating couplers coupled with optical fibers can provide the evaluation of the phase error characteristic of the coherent optical mixer circuit 912. During this, the use of the photo detectors 910 and 911 is not required and the electrode does not have to contact with a probe. Thus, the evaluation can be carried out in a simpler manner and the risk of making an unusable circuit is also excluded.

As described above, Embodiment 9 can realize, as in Embodiment 8, an optical reception circuit that can evaluate the phase error characteristic and that does not require a step of cutting a delay circuit. In addition, the photo detector integrated on the same chip can realize an optical reception circuit in a simple manufacturing step and low-cost.

Although not shown in FIG. 29, as in Embodiment 4 of FIG. 21, by allowing the monitor light input mechanism to similarly include a grating coupler, the phase error characteristic of the chip can be evaluated in the wafer status and the inspection step after a chip cutting process can be reduced significantly.

Furthermore, the phase error characteristic is evaluated without using a photo detector. Thus, when compared with Embodiment 8, the evaluation can be carried out in a simple manner and the risk of making an unusable circuit due to the evaluation can be avoided.

As described in the above nine embodiments, the present invention can realize a coherent optical mixer circuit and an optical polarization separation/demodulation circuit by which the need for a step of cutting away a delay circuit is eliminated and the phase error characteristic can be evaluated.

In all of the embodiments, the upper clad and the lower clad were made of quartz glass. However, the present invention is not limited to this material. In Embodiments 3, 4, 8, and 9, the upper clad and the lower clad may be made of material having a lower refractive index than that of $Si_3N_4$. In the other embodiments, the upper clad and the lower clad may be formed by material having a refractive index lower than that of silicon.

In all of the embodiments, the upper clad and the lower clad had thicknesses of specific values. However, the present invention is not limited to these values and may have any thickness so long as the thickness is similar to that of the core or more.

In the respective embodiments, no specific configuration was described for the 2-branched light splitter. However, many methods have been known to realize the 2-branched light splitter in a silicon or $Si_3N_4$ waveguide, any of which can be applied. Typical methods include a 1-input-and-2-output MMI for example.

In the respective embodiments, no specific configuration was described for the polarization beam splitter. However, many methods have been known to realize the polarization beam splitter in a silicon waveguide, any of which can be applied. Typical methods include a simple directional coupler.

In the respective embodiments, no specific configuration was described for the polarization rotation circuit. However, many methods have been known to realize the polarization rotation circuit in the silicon waveguide, any of which can be applied. One example of which is described in Patent Literature PTL 1.

INDUSTRIAL APPLICABILITY

As described above, the present invention can provide a coherent optical mixer circuit, a light demodulation circuit, and an optical reception circuit by which the phase error can be evaluated without requiring a step of cutting away a delay circuit. In addition, a light demodulation circuit and an optical reception circuit can be provided that can provide the evaluation of the phase error in the wafer status prior to the chip cutting process. Thus, the present invention can reduce the time and cost to manufacture a coherent optical mixer circuit and an optical polarization separation/demodulation circuit and can increase the chip yield per wafer.

REFERENCE SIGNS LIST

9100, 130, 200, 220, 330, 400, 500, 600, 700, 800, 900 Optical polarization separation/demodulation circuit (light demodulation circuit, optical reception circuit)

9104, 9105, 100, 300, 512, 612, 712, 812, 912 Coherent optical mixer circuit

9101, 134, 204, 334, 404, 504, 604, 704, 804, 904 Polarization beam splitter

9102, 135, 205, 335, 405, 505, 605, 705, 805, 905 Polarization rotation circuit

9103, 107, 132, 202, 332, 402, 502, 602, 702, 802, 902 Optical power splitter

307 Optical power splitter ($Si_3N_4$ waveguide)

9106, 9107, 510, 511, 610, 611, 710, 711, 810, 811, 910, 911 Photo detector
9204, 9205, 101, 102, 131, 133, 201, 203, 301, 302, 331, 333, 401, 403, 501, 503, 601, 603, 701, 703, 801, 803, 901, 903 Input waveguide
9200, 108, 138, 139, 208, 209, 508, 509, 608, 609, 708, 709 Monitor input waveguide
308, 338, 339, 408, 409, 808, 809, 908, 909 Monitor input waveguide ($Si_3N_4$ waveguide)
9206, 9207, 9208, 9209, 104, 304 Output waveguide
9202, 9203, 105, 106, 309, 310 Delay circuit
305, 306 Delay circuit ($Si_3N_4$ waveguide)
9401, 103, 303 Multimode interference circuit (MMI circuit)
136, 137, 206, 207, 221, 222, 406, 407, 506, 507, 606, 607, 706, 707 Input mechanism
140, 141, 210, 211, 340, 341, 410, 411, 713, 714, 913,914 Output mechanism
311, 312 Interlayer connection
121, 217, 324, 418, 527 Upper clad
323, 417 Intermediate clad
122, 216, 322, 416, 528 Lower clad
123, 215, 321, 415, 529 Silicon substrate

The invention claimed is:

1. A coherent optical mixer circuit including a 4-input-and-4-output multimode interference circuit having a silicon waveguide in which the multimode interference circuit has two odd-numbered or even-numbered inputs that are connected to an input mechanism of externally-inputted signal light and reference light via input waveguides and the four outputs of the multimode interference circuit are all connected to an output mechanism to the exterior via output waveguides, wherein:
the other two inputs of the multimode interference circuit are connected to two monitor waveguides,
one of the monitor waveguide is longer than the other of the monitor waveguide to configure a light delay circuit,
the monitor waveguides constituting the light delay circuit are connected to respective outputs of a 2-branched light splitter, and
the 2-branched light splitter has an input connected to a monitor light input mechanism from the exterior via a monitor input waveguide;
wherein:
at least a part of the monitor waveguide is formed by a silicon waveguide,
the remaining portion of the monitor waveguide and the 2-branched light splitter connected to the monitor waveguide and the monitor input waveguide, and the monitor light input mechanism connected to the monitor input waveguide are formed by a light waveguide formed in another layer different from that of the silicon waveguide, and
a part of the monitor waveguide formed by the silicon waveguide and the light waveguide of another layer different from that of the silicon waveguide are interlayer-coupling, and
the interlayer-coupling is a structure comprising the part of the monitor waveguide formed by the silicon waveguide and the part of the light waveguide formed in another layer different from that of the silicon waveguide, wherein
each tips of the waveguides are formed in a tapered shape, and the tips of the tapered shape are formed in the direction to face each other,
and the tips of the tapered shape are overlapping seen from a vertical direction to substrate.

2. The coherent optical mixer circuit according to claim 1, wherein:
the output waveguides of the multimode interference circuit includes a waveguide intersection.

3. The coherent optical mixer circuit according to claim 1, wherein:
at least one of the signal light and reference light input mechanism, the monitor light input mechanism, and the output mechanism comprises a grating coupler.

4. The coherent optical mixer circuit according to claim 1, wherein:
the waveguides formed in another layer different from that of the silicon waveguide are made of a material having a refractive index between those of silicon and quartz.

5. The coherent optical mixer circuit according to claim 1, wherein:
the output mechanism is connected to a photo detector.

6. The coherent optical mixer circuit according to claim 5, wherein:
the photo detector has a subsequent stage including a grating coupler, and
light not absorbed by the photo detector is outputted from the grating coupler.

7. A polarization separation-type coherent optical mixer circuit including two coherent optical mixer circuits according to claim 1 of the invention, wherein:
the reference light inputted from the input mechanism is 2-branched by a light splitter and the resultant lights are inputted to two coherent optical mixer circuits, respectively,
the signal light inputted from the input mechanism is optical polarization-separated by a polarization beam splitter,
one polarized signal light obtained through the optical polarization-separation is inputted to a first coherent optical mixer circuit,
the other polarized signal light obtained through the optical polarization-separation is inputted to a second coherent optical mixer circuit via a polarization rotation circuit,
monitor lights are inputted from two monitor light input mechanism to two coherent optical mixer circuits, respectively, and
the polarization separation-type coherent optical mixer circuit has a coherent-type polarization diversity configuration.

* * * * *